(12) United States Patent
Bass et al.

(10) Patent No.: US 12,727,974 B2
(45) **Date of Patent: *Sep. 8, 2026**

(54) DENTAL IMPLANT ASSEMBLY WITH BASE MEMBER HAVING OBROUND SHAPED EXTERNAL SURFACE

(71) Applicant: Quadric BioMed, LLC, Colorado Springs, CO (US)

(72) Inventors: Aaron C. Bass, Colorado Springs, CO (US); James C. Grant, Colorado Springs, CO (US); Bradley W. Renehan, Colorado Springs, CO (US)

(73) Assignee: Quadric BioMed, LLC, Colorado Springs, CO (US)

( * ) Notice: Subject to any disclaimer, the term of this patent is extended or adjusted under 35 U.S.C. 154(b) by 89 days.

This patent is subject to a terminal disclaimer.

(21) Appl. No.: 18/969,402

(22) Filed: Dec. 5, 2024

(65) Prior Publication Data

US 2025/0090280 A1 Mar. 20, 2025

Related U.S. Application Data

(63) Continuation of application No. 18/625,520, filed on Apr. 3, 2024, now Pat. No. 12,161,527, which is a (Continued)

(51) Int. Cl.
*A61C 8/00* (2006.01)

(52) U.S. Cl.
CPC .......... *A61C 8/0045* (2013.01); *A61C 8/0068* (2013.01); *A61C 8/0069* (2013.01)

(58) Field of Classification Search
CPC ............................ A61C 8/0037; A61C 8/0045
See application file for complete search history.

(56) References Cited

U.S. PATENT DOCUMENTS

| | | |
|---|---|---|
| 3,934,347 A | 1/1976 | Lash et al. |
| 4,086,701 A | 5/1978 | Kawahara et al. |

(Continued)

FOREIGN PATENT DOCUMENTS

| | | |
|---|---|---|
| CA | 2732001 A1 | 9/2009 |
| CA | 2732001 C | 2/2014 |

(Continued)

OTHER PUBLICATIONS

PCT/US2025/022411, International Search Report and Written Opinion of the International Searching Authority, Mailed May 13, 2025, 9 pgs.

(Continued)

*Primary Examiner* — Heidi M Eide

(57) ABSTRACT

A dental implant assembly comprises a base member and an abutment member. The base member is adapted for placement into an opening in a jawbone and comprises elongated vertically parallel side walls coupled with opposing curved end walls which together define an eccentrically shaped external surface and an eccentrically shaped internal cavity. The base member also includes an eccentrically shaped curved lip which couples top edge perimeters of the external surface and the internal cavity to one another. The abutment member is adapted for placement into the eccentrically shaped internal cavity of the base member. Responsive to placement of the abutment member in the eccentrically shaped internal cavity of the base member, a trans-gingival emergence profile is formed between the eccentrically shaped curved lip and a region of the lower portion between the eccentrically shaped curved lip and the shoulder.

15 Claims, 29 Drawing Sheets

Related U.S. Application Data continuation-in-part of application No. 17/618,819, filed as application No. PCT/US2020/034312 on May 22, 2020, now abandoned, said application No. 18/625,520 is a continuation-in-part of application No. 15/905,306, filed on Feb. 26, 2018, now abandoned, which is a continuation-in-part of application No. 15/640,351, filed on Jun. 30, 2017, now abandoned, which is a continuation-in-part of application No. 14/642,565, filed on Mar. 9, 2015, now Pat. No. 9,737,376.

(60) Provisional application No. 62/852,472, filed on May 24, 2019, provisional application No. 61/949,908, filed on Mar. 7, 2014.

(56) References Cited

U.S. PATENT DOCUMENTS 4,447,209 A 5/1984 Sutter
4,713,003 A 12/1987 Symington et al.
4,820,156 A 4/1989 Ross
4,820,159 A 4/1989 Weissman
4,988,297 A 1/1991 Lazzara et al.
5,018,970 A 5/1991 Stordahl
5,022,860 A 6/1991 Lazzara et al.
5,040,982 A 8/1991 Stefan-Dogar
5,135,395 A 8/1992 Marlin
5,246,370 A 9/1993 Coatoam
5,297,963 A 3/1994 Dafatry
5,492,471 A 2/1996 Singer
5,513,989 A 5/1996 Crisio
5,564,925 A 10/1996 Shampanier
5,571,015 A 11/1996 Siegmund
5,591,029 A 1/1997 Zuest
5,810,592 A 9/1998 Daftary
6,068,479 A 5/2000 Kwan
6,120,292 A 9/2000 Buser et al.
6,168,436 B1 1/2001 Obrien
6,250,922 B1 6/2001 Bassett et al.
6,287,117 B1 9/2001 Niznick
6,290,500 B1 9/2001 Morgan et al.
6,436,103 B1 8/2002 Suddaby
6,454,569 B1 9/2002 Hollander et al.
6,537,069 B1 3/2003 Simmons
6,843,653 B2 1/2005 Carlton
6,863,529 B2 3/2005 Strong et al.
7,056,117 B2 6/2006 Simmons
7,097,451 B2 8/2006 Tang
7,101,177 B2 9/2006 Lin
7,104,991 B2 9/2006 Dixon et al.
7,806,685 B1 10/2010 Grant
8,231,388 B2 7/2012 Grant
8,287,278 B2 10/2012 Grant
8,562,244 B2 10/2013 D'Almeida
8,562,344 B2 10/2013 Grant
8,740,616 B2 6/2014 Grant et al.
9,737,376 B2 8/2017 Stewart et al.
9,925,024 B2 3/2018 Bellanca et al.
10,016,256 B2 7/2018 Simmons
10,905,529 B2 2/2021 Haydar
2002/0076673 A1 6/2002 Wagner et al.
2003/0003128 A1 1/2003 Chiarelli
2003/0087217 A1 5/2003 Coatoam
2003/0180686 A1 9/2003 Simmons
2003/0232308 A1 12/2003 Simmons
2004/0265781 A1 12/2004 Coatoam
2005/0019730 A1 1/2005 Gittleman
2005/0136378 A1 6/2005 Ennajimi et al.
2005/0202368 A1 9/2005 Ganley
2006/0014120 A1 1/2006 Sapian
2006/0093988 A1 5/2006 Swaelens et al.
2006/0281049 A1 12/2006 Ho
2008/0118892 A1 5/2008 Adams
2008/0124675 A1 5/2008 Adams
2009/0081612 A1 3/2009 Jorneus et al.
2009/0111072 A1 4/2009 Lombardo et al.
2009/0123891 A1 5/2009 Rosenberg
2009/0226857 A1 9/2009 Grant
2009/0258329 A1 10/2009 Adams
2010/0112522 A1 5/2010 Kwon
2010/0159419 A1 6/2010 Grant
2010/0266987 A1 10/2010 Ford
2010/0330534 A1 12/2010 Hyun
2011/0008753 A1 1/2011 Rupprecht et al.
2011/0053114 A1 3/2011 Shimoda
2011/0118742 A1 5/2011 Hulliger et al.
2011/0151408 A1 6/2011 Grant
2011/0200969 A1 8/2011 Schroering
2012/0100502 A1 4/2012 Djordjevic
2012/0196250 A1 8/2012 Grant et al.
2013/0309632 A1 11/2013 Sanders
2014/0127644 A1 5/2014 Haydar
2014/0272793 A1 9/2014 Grant et al.
2015/0250564 A1 9/2015 Stewart et al.
2016/0045290 A1 2/2016 Poovey
2017/0239021 A1 8/2017 Klein et al.
2017/0296307 A1 10/2017 Simmons et al.
2018/0140389 A1 5/2018 Gazelakis et al.
2018/0177573 A1 6/2018 Denton et al.
2022/0233280 A1 7/2022 Bass et al.
2024/0245494 A1 7/2024 Bass et al.
2025/0090281 A1 3/2025 Bass et al.

FOREIGN PATENT DOCUMENTS

DE 102011112446 A1 3/2013
WO WO-2005053565 A2 * 6/2005 ............. A61C 1/084

OTHER PUBLICATIONS

PCT/US2011/022737, International Preliminary Report on Patentability, issued Jul. 31, 2012, 9 pgs.
PCT/US2011/022737, International Search Report and Written Opinion of the International Searching Authority, mailed Mar. 23, 2011, 9 pgs.
PCT/US2012/063792, International Preliminary Report on Patentability, issued May 20, 2014, 8 pgs.
PCT/US2012/063792, International Search Report and Written Opinion of the International Searching Authority, mailed Jan. 31, 2013, 17 pgs.
PCT/US2020/034312, International Preliminary Report on Patentability, issued Nov. 16, 2021, 11 pgs.
PCT/US2020/034312, International Search Report and Written Opinion, mailed Oct. 5, 2020, 19 pgs.

* cited by examiner

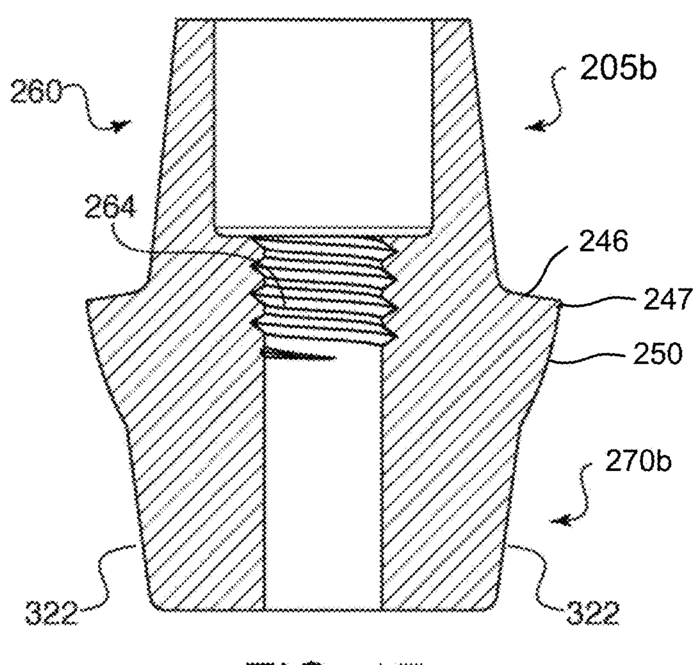
FIG. 17
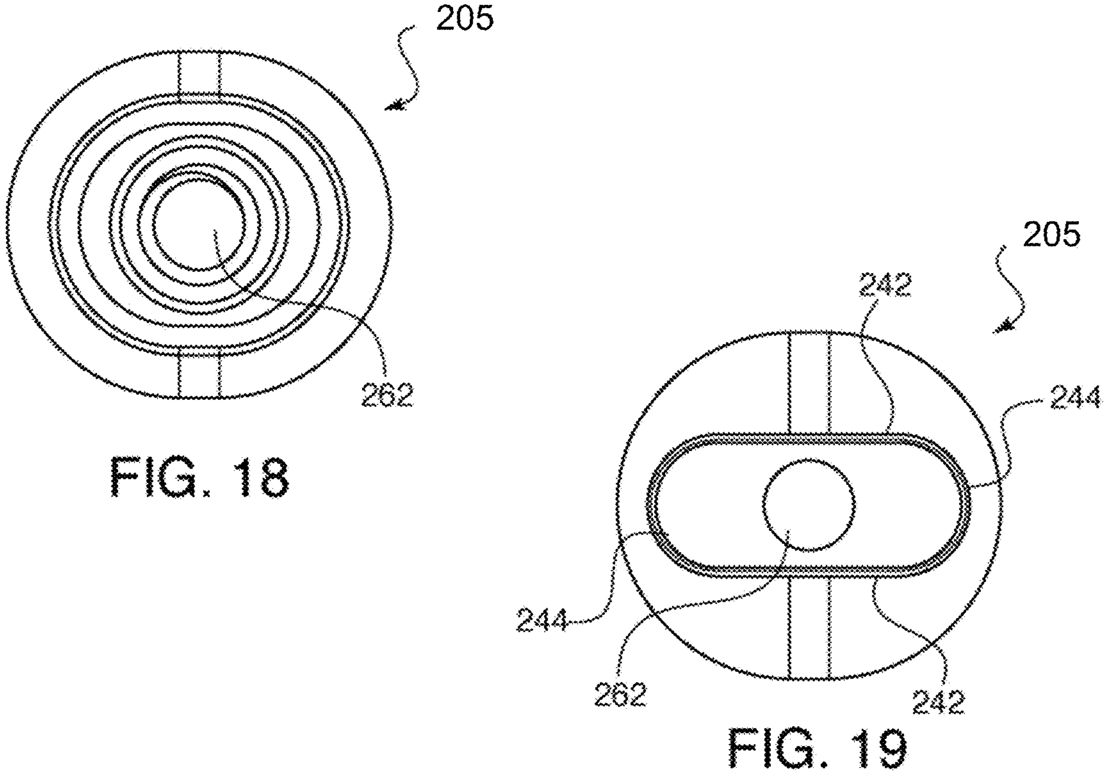
FIG. 18
FIG. 19

DENTAL IMPLANT ASSEMBLY WITH BASE MEMBER HAVING OBROUND SHAPED EXTERNAL SURFACE

REFERENCE TO RELATED APPLICATIONS

This application is a continuation application of and claims priority to and benefit of U.S. patent application Ser. No. 18/625,520 (now U.S. Pat. No. 12,161,527) filed on Apr. 3, 2024 titled "DENTAL IMPLANT WITH IMPROVED TRANS-GINGIVAL EMERGENCE PROFILE" by Aaron Bass et al., and assigned to the assignee of the present application, the disclosure of which is hereby incorporated herein by reference in its entirety.

Application Ser. No. 18/625,520 is a continuation-in-part application of and claims priority to and benefit of co-pending U.S. patent application Ser. No. 17/618,819 filed on Dec. 13, 2021 titled "DENTAL IMPLANT SYSTEM" by Aaron Bass et al., and assigned to the assignee of the present application, the disclosure of which is hereby incorporated herein by reference in its entirety.

Application Ser. No. 17/618,819 claimed priority, benefit of, and is a U.S. National stage entry of PCT/US2020/034312, filed May 22, 2020, titled "DENTAL IMPLANT SYSTEM," by Aaron Bass et al., the entirety of which is incorporated by reference herein in its entirety for all purposes.

PCT/US2020/034312 claims priority to and benefit of U.S. Provisional Patent Application No. 62/852,472, filed May 24, 2019, titled "DENTAL IMPLANT SYSTEM," by Aaron Bass et al., the entirety of each of which is incorporated by reference herein in its entirety for all purposes.

Application Ser. No. 18/625,520 is also a continuation-in-part application of and claims priority to and benefit of co-pending U.S. patent application Ser. No. 15/905,306 filed on Feb. 26, 2018 entitled "DENTAL IMPLANT SYSTEM" by Richard Victor Denton et al., and assigned to the assignee of the present application, the disclosure of which is hereby incorporated herein by reference in its entirety.

U.S. patent application Ser. No. 15/905,306 is a continuation-in part of U.S. Ser. No. 15/640,351 filed Jun. 30, 2017, titled "Dental Implant System," which application is a continuation-in-part of U.S. Ser. No. 14/642,565 (now U.S. Pat. No. 9,737,376) filed Mar. 9, 2015 titled "Eccentric Dental Implant System," which application claims the benefit of U.S. Provisional Patent Application No. 61/949,908, filed Mar. 7, 2014, the entirety of each of which was incorporated by reference for all purposes into U.S. patent application Ser. No. 15/905,306.

BACKGROUND

Dental implants are a popular way to replace a tooth. Due to their relatively low maintenance and their durability, people increasingly prefer implants to bridges or dentures. A dental implant assembly is configured to be positioned in an osteotomy cavity formed in a patient's jawbone. A base member of the implant is positioned into the cavity. The base member serves as a platform to secure an abutment member of the implant that in turn receives a dental restoration, such as a crown or denture.

BRIEF DESCRIPTION OF THE DRAWINGS

A further understanding of the aspects of the disclosure may be realized by reference to the following figures. In the figures, similar components or features may have the same reference label. Further, various components of the same type may be distinguished by immediately following the reference label with a second label that distinguishes among the similar components. When only the first reference label is used in the specification, the description is applicable to any one of the similar components having the same first reference label irrespective of whether the second reference label is recited. Unless specifically noted, the drawings referred to in this Brief Description of Drawings should be understood as not being drawn to scale.

FIG. 17 shows a side cross-sectional view of an alternate abutment member, having a tapered lower portion.

FIG. 18 shows a bottom plan view of the abutment member of FIG. 14.

FIG. 19 shows a top plan view of the abutment member of FIG. 14.

DETAILED DESCRIPTION

Figure 1:
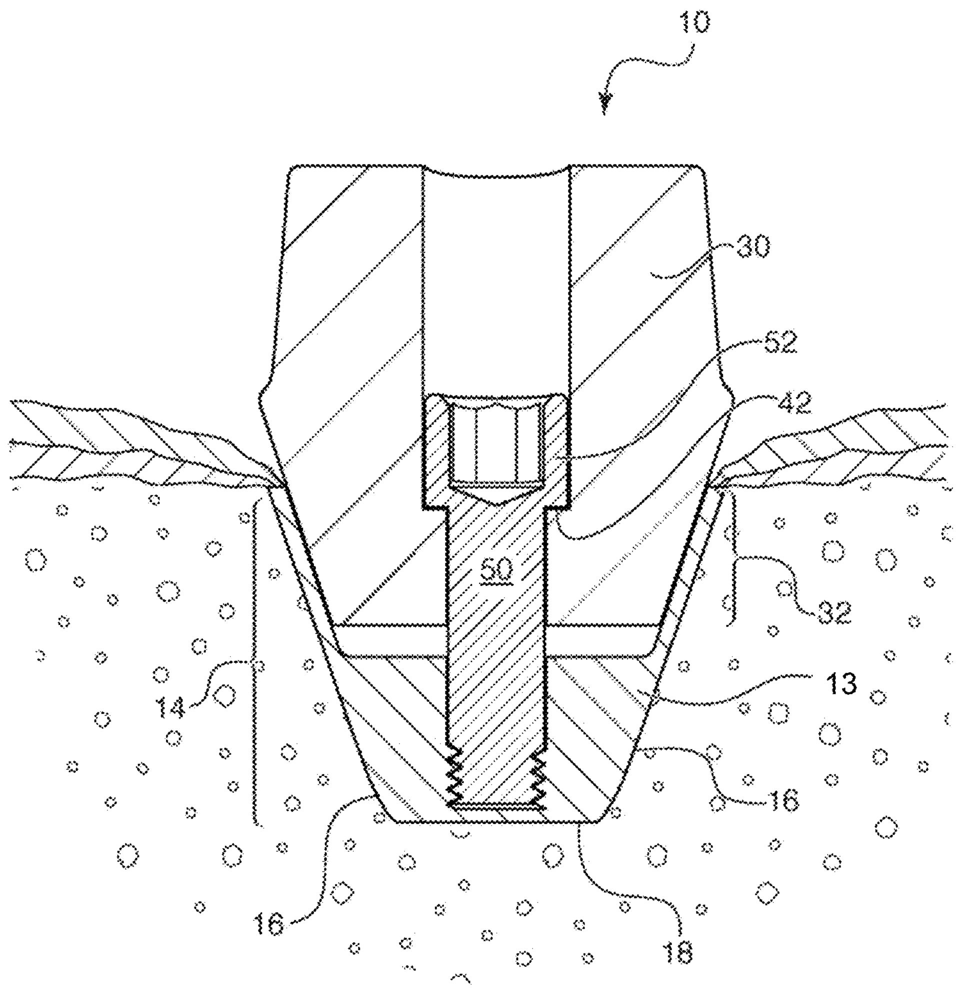
FIG. 1 shows a cross-sectional side view of one embodiment of a dental implant.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

Even though dental implants are popular and common for replacing teeth, there remain significant complications that are the result of using a round implant in a jawbone space that formerly supported a non-round or eccentric tooth and is therefore undersized in one or more horizontal dimensions in relation to the tooth it would replace. These complications include food impaction, bacteria collection, and excessive stress on bone and implant components. Various implant assemblies which include an eccentrically-shaped base member and an eccentrically-shaped abutment member are described herein. The eccentric shape and the trans-gingival "emergence profile" it presents, as such an eccentrically-shaped implant assembly crosses through the gingiva of a patient, significantly reduces and/or eliminates these noted problems with round implants and various other conventional implants.

After placement in the bone, an eccentrically shaped dental implant base member presents a cross-section on its exposed face, the dimensions of which limit the shape, size, and location of the emergence profile of the dental implant assembly. Components, methods, and techniques described herein involve a dental implant assembly that includes an eccentrically shaped base member and an eccentrically shaped abutment member. Together, the eccentrically shaped base member and abutment member act to control the emergence profile of the overall dental implant assembly as it emerges from bone, passes through the gingiva, and supports a crown that may be mounted atop the dental implant assembly to complete the tooth restoration. As depicted herein, the eccentrically shaped base member of the implant assembly presents a face, the shape of which defines the possible emergence profiles, and this face hosts a cavity which receives the eccentrically shaped abutment member of the implant assembly that in turn receives a dental restoration, such as a crown or denture. In practice, the eccentrically shaped base member is fitted to be positioned within an eccentrically-shaped osteotomy box or cavity formed within a patient's jawbone. Following the osteotomy and the insertion of the base member, an eccentrically shaped abutment member may then be fitted to the base member. Some embodiments described herein provide an endosseous implant body positioned through a central passage formed within the base member and the abutment member that is torqued into place to rigidly secure the dental implant assembly to the jawbone. Other embodiments provide the base member be press fit or cemented into the patient's jawbone.

Discussion begins with some description of notation and nomenclature and definitions of terms used herein in the description of the components of a dental implant assembly. Discussion then turns to description of various components and embodiments of a dental implant assembly which includes an eccentrically shaped base member and an eccentrically shaped abutment member which together characterize the overall shape of the dental implant assembly. Discussion then focuses on the improved trans-gingival emergence profile presented by the assembled dental implant as it emerges from bone, passes through gingiva, and transitions to the dental restoration which may be mounted atop the dental implant assembly. An example of an alternative embodiment of a dental implant which presents a similar trans-gingival emergence profile is then described.

Notation and Nomenclature

When placing a dental implant as discussed throughout, a space or osteotomy cavity is formed in jawbone and then a base member is positioned into the space. In general, the base member serves as a platform to secure an abutment that in turn receives a dental restoration, such as a crown or denture. In one aspect, the outer cross-section of the base member is eccentric in cross-section. The term "eccentric" is used herein to mean non-circular and in some embodiments non-radially symmetric. In some embodiments, eccentric as used herein may include 180 degree rotational symmetry, but no other rotational/radial symmetry. Eccentric includes "rounded" or "soft" triangular shapes, "rounded" or "soft" rectangular shapes, "rounded" or "soft" square shapes, "rounded" or "soft" trapezoidal shapes, any "rounded" or "soft" polygonal shape, an oval or elliptical shape, or any other appropriate rounded but non-circular shape. The edges are generally intended to be "rounded" or "soft," similar to tooth curvatures. Providing an eccentric external cross-section prevents the base member from rotating within bone, due to its eccentric shape. The base member may have a relatively large surface area that is in contact with or integrated into the jawbone, and this decreases stress on the bone, implant, abutment, and crown. In another aspect, the base member has a recess that receives the bottom end of the abutment. In some embodiments, both the recess and the bottom end of the abutment (referred to herein as the "lower portion"), which nests therein, are shaped to match the eccentric, non-circular (and in some instances non-radially symmetric) geometry of the base member. This provides a precise friction connection for the physician to position the abutment within the base in a correct orientation, prevents the abutment from rotating relative to the base member, creates a tight seal, and distributes forces throughout the connected pieces. Certain embodiments may provide an implant body positioned through the base member and the abutment member. Other embodiments use a fastener to secure the base member to the abutment member, but that does not extend through the base member. Other embodiments press fit a base member and abutment member to one another, without use of a fastener or implant body.

Example Dental Implant Assemblies and Components

Figure 2:
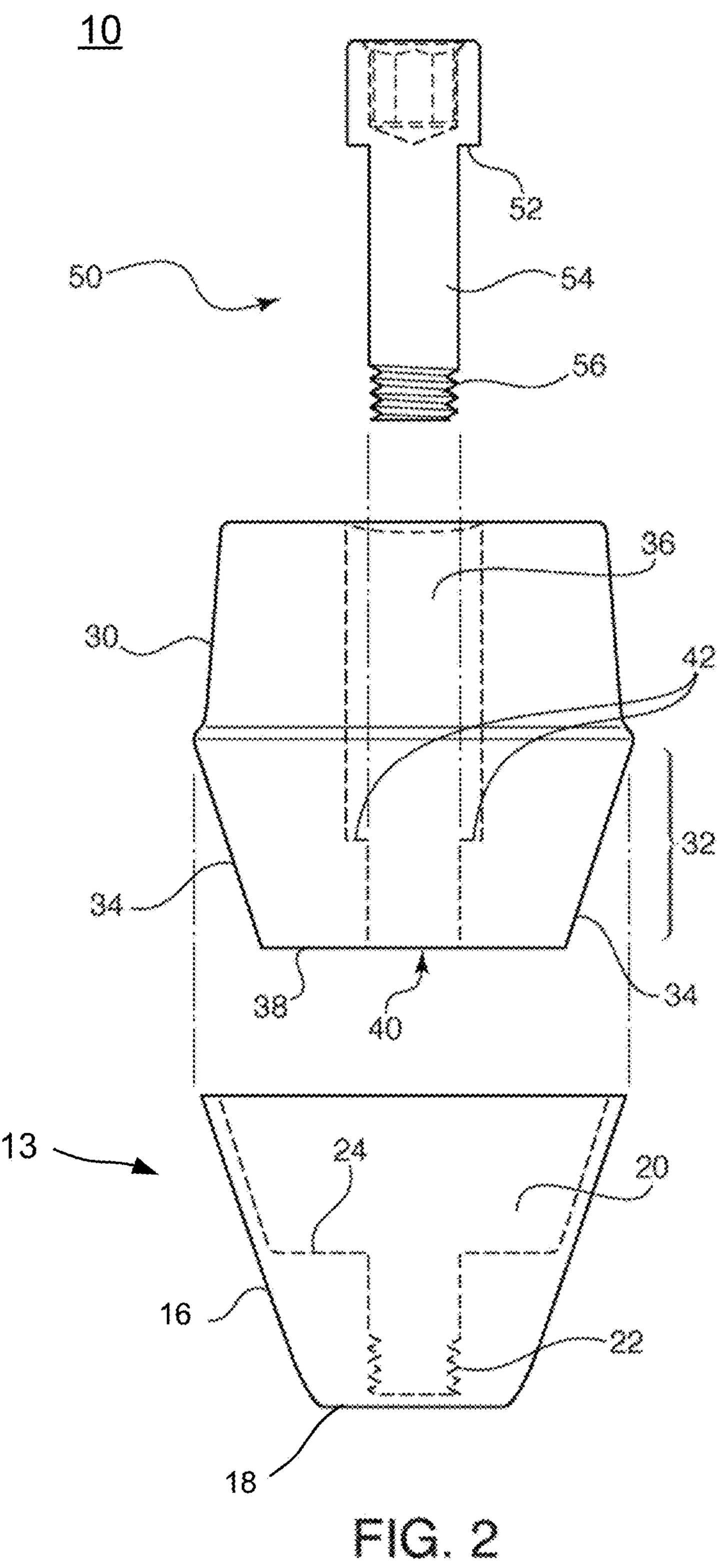
FIG. 2 shows an exploded view of the implant of FIG. 1.

Referring now to FIGS. 1 and 2, examples of a dental implant 10 are shown and described. As illustrated by FIGS. 1 and 2, the dental implant 10 may include a base member 13 that is configured to be press fit or cemented into place with respect to a patient's jawbone. The base member 13 may be shaped somewhat as a basket and is commonly referred to as a "basket" by some physicians due to this shape and its holding of an abutment in its cavity in the same manner a basket would be used to hold items. The base member 13 has an eccentric (rounded, but non-circular) shape, which can help prevent it from twisting upon application of torque once implanted. The base member 13 has a lower bone-contacting surface 14. The lower bone-contacting surface 14 may define angled side walls 16 and a flat base wall 18. It is envisioned that angled side walls 16 may help implantation of the base member 13, but it should be understood that straight or parallel walls are possible and considered within the scope of this disclosure, as described further below. The flat base wall 18 is illustrated as being a solid base without an opening therethrough or extensions or securement members extending further downward therefrom. Alternate base members configured to receive an implant body are also described further below. This particular embodiment of FIGS. 1 and 2 is designed to be press fit or cemented into place, rather than being secured with a fastener or receiving an implant body.

For press-fitting the base member 13 into place, it is expected that angled side walls 16 may help "wedge" the base member securely in place. The bone-contacting surface 14 may be provided with one or more bone ingrowth/encouraging features, such as ridges, a surface roughness, a bone ingrowth/encouraging chemical or substance, or any combination thereof, all of which can help encourage implantation stability of the base member 13. In other examples, the base member 13 may be cemented into place. Various types of bone glues or bone cements are possible for use herewith. For example, there are bone glues being developed that can set quite quickly, which may allow for the possibility of implanting the dental implants described herein in one sitting, in some instances. (Whereas currently, as described in more detail below, a base member is typically positioned and secured into place; and this secured configuration is then allowed to heal for several months prior to completion of the remainder of the surgery. However, there is a movement toward immediately inserting the abutment in the same sitting as the installation of the base, which is in particular possible if fast drying glue or cement is used. This dispenses with the healing cap and tissue former. The presently-described embodiments may be used consistent with this trend. However, it is also possible that once the base member and its accompanying components are implanted, a healing cap and tissue former may be used to allow the base member to heal prior to placement of the remainder of the components.)

As shown more clearly in FIG. 2, the interior of the base member 13 defines a cavity 20. Cavity 20 is configured to receive an abutment 30, as described further below. Cavity 20 may be provided with internal screw threads 22. Internal screw threads 22 are configured to receive a fastener 50, as also described further below. It is possible, however, to secure the base member 13 and abutment 30 without the use of internal screw threads or a fastener. The components may directly nest and be glued, cemented, or otherwise adhered to one another.

FIG. 1 also shows an abutment 30 in position within cavity 20 of base member 13. The abutment 30 is configured with a lower portion 32 that nests within cavity 20. The lower portion 32 may have angled side walls 34 that closely track the angle and configuration of angled side walls 16 of the base member 13. A central channel 36 extends through the abutment 30. The lower surface 38 of the abutment 30 is illustrated as having an opening 40 therethrough. The central channel 36 and the opening 40 are configured to receive an optional fastener 50 for securing the abutment 30 to the base member 13 in use. The central channel 36 may be provided with interior ledges 42 that are configured to support the fastener head 52. A remainder of the abutment body is generally solid material. Although FIG. 1 illustrates space between the base member 13 and the abutment 30, it should be understood that the components may completely nest, with surfaces 38 and 24 contacting one another.

Fastener 50 is illustrated as having a fastener head 52, a shank 54, and lower threads 56. The fastener head 52 is configured to abut the interior ledges 42 when the fastener is in place, as illustrated by the completed assembly 10 of FIG. 1. The lower threads 56 cooperate with the internal screw threads 22 of the base member. FIG. 2 illustrates an exploded view of the base member 13, abutment 30, and fastener 50, prior to their assembly and securement to one another.

Each of the above-described configurations is designed to be press fit or glued or cemented into a patient's jawbone. Each embodiment illustrates a base member with a thickened base wall. The thickened base wall can accommodate a female thread from a fastener that secures the abutment in place. It should be understood, however, that it may be possible to press fit or glue or cement the base member and abutment with respect to one another, removing the need to use fastener 50. Accordingly, it is possible to provide a design that does not include internal screw threads 22 or central channel 36 or interior ledges 42. In other words, the base member and the abutment may directly cooperate with one another without use of a fastener or other securement member.

Figure 3:
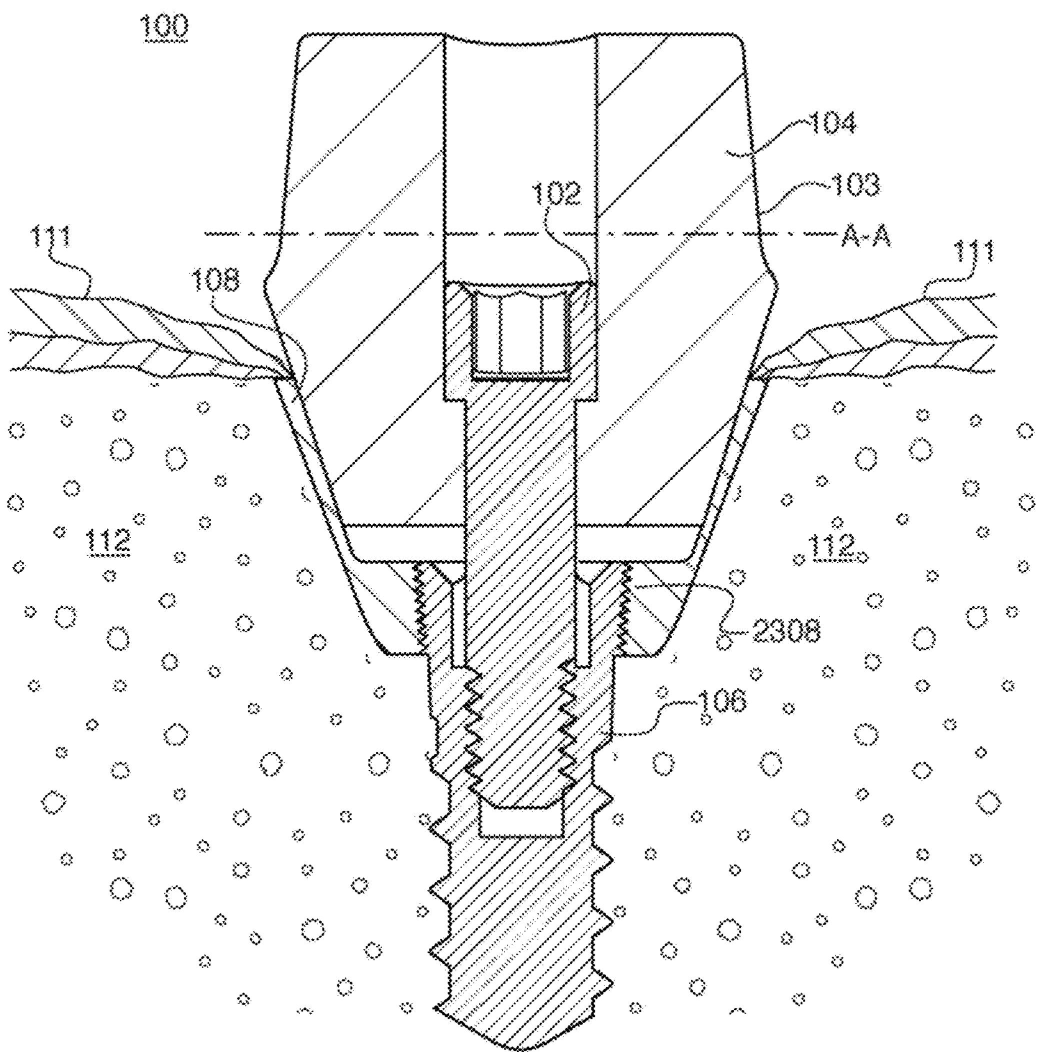
FIG. 3 shows a side cross-sectional view of one embodiment of a base member having an abutment and an implant body secured therein.
Figure 4:
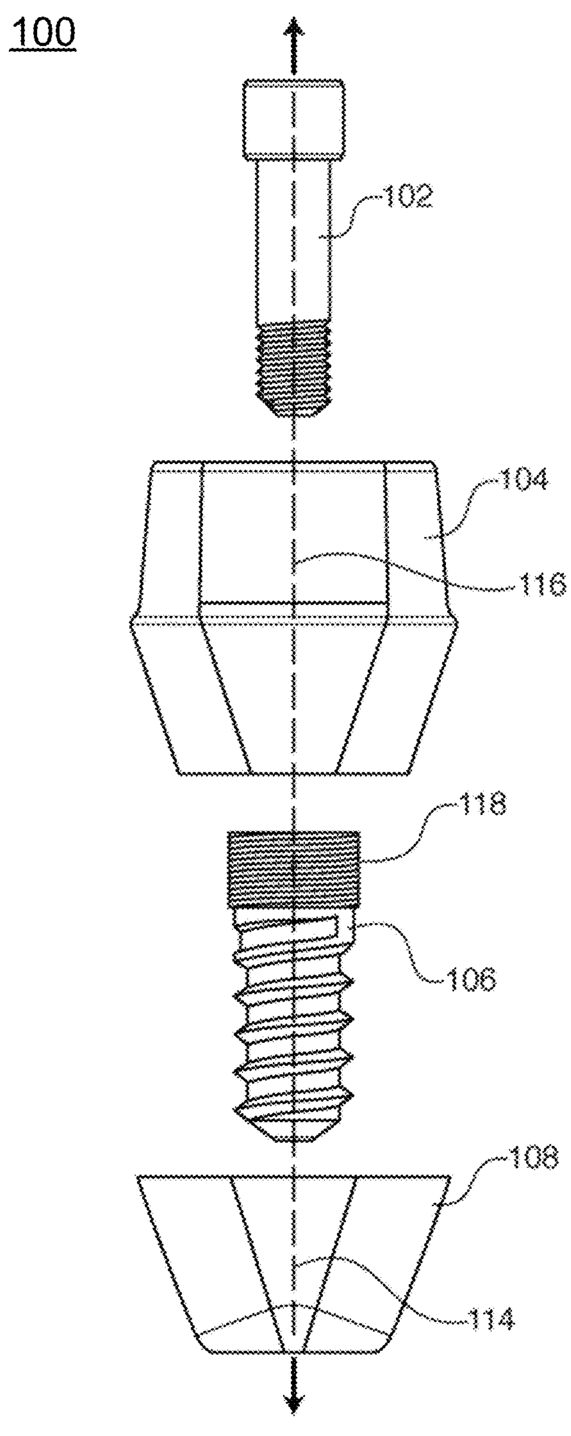
FIG. 4 shows an exploded side elevational view of the embodiment of FIG. 3.

Referring now to FIGS. 3 and 4, an alternate dental implant 100 is shown and described. The dental implant 100 includes or comprises a fastener 102, an abutment member 104, an endosseous implant body 106, and a base member 108. In practice, the base member 108 is fitted to or positioned within an eccentrically-shaped (e.g., oval-like) osteotomy box or cavity formed within jawbone 112, shown in FIG. 3 in exaggerated and simplified view. It is possible for the outer dimensions and shape of the abutment member 104, where it is inserted into the base member 108, to be designed to be closely aligned with the base member dimensions (generally called platform matching), or the outer dimensions of the abutment can be slightly smaller than the base member while generally following the shape of the base member (generally called platform switching). The tissue 111 may be folded back to carry out the osteotomy that is to accommodate the base member 108. This may involve drilling of a small pilot hole within the jawbone 112 for carrying out the osteotomy. Then, the base member 108 may be inserted. A pilot hole is further drilled with base member already in place as a guide, for subsequent insertion of the endosseous implant body 106. The endosseous implant body 106 can be positioned through a central passage 114 (formed along an axis) formed within the base member 108 and then is torqued into place to rigidly secure the base member 108 to the jawbone 112. In some examples, the central passage may be tapered and matches a taper in the head of endosseous implant body 106. In so doing, a friction fit or cold weld is formed between the endosseous implant body 106 and the base member 108 similar to that described in U.S. Pat. Nos. 8,562,244 and 8,740,616, incorporated herein by reference.

In some examples, the central passage 114 includes threads that interact or mate with corresponding threads 2308 in the head of the endosseous implant body 106 to create a tightly sealed connection whereby the endosseous implant body 106 and surfaces of the central passage 114 are cinched tightly together. More specifically, the threaded connection between the endosseous implant body 106 and the base member 108 serves to maintain the friction fit or cold weld between the tapered sections so as to prevent micro-leakages between the two components. Although a threaded connection is shown and described, it should be understood that this connection could also be cemented, cold welded, or use any other appropriate attachment technique. These connections may be used with or without a threaded connection. The abutment member 104 may then be fitted to or positioned within the base member 108. The fastener 102 may then be positioned through an internal passage 116, formed within the abutment member 104 and then may be torqued into place within a receiver 118 formed within the endosseous implant body 106, to rigidly secure the abutment member 104 to the base member 108. The cross-section of the base member 108 is generally non-circular or eccentric in that an outer surface 103 of the abutment member 104, when viewed in cross-section, exhibits a non-circular or eccentric shape.

Figures 7, 8:
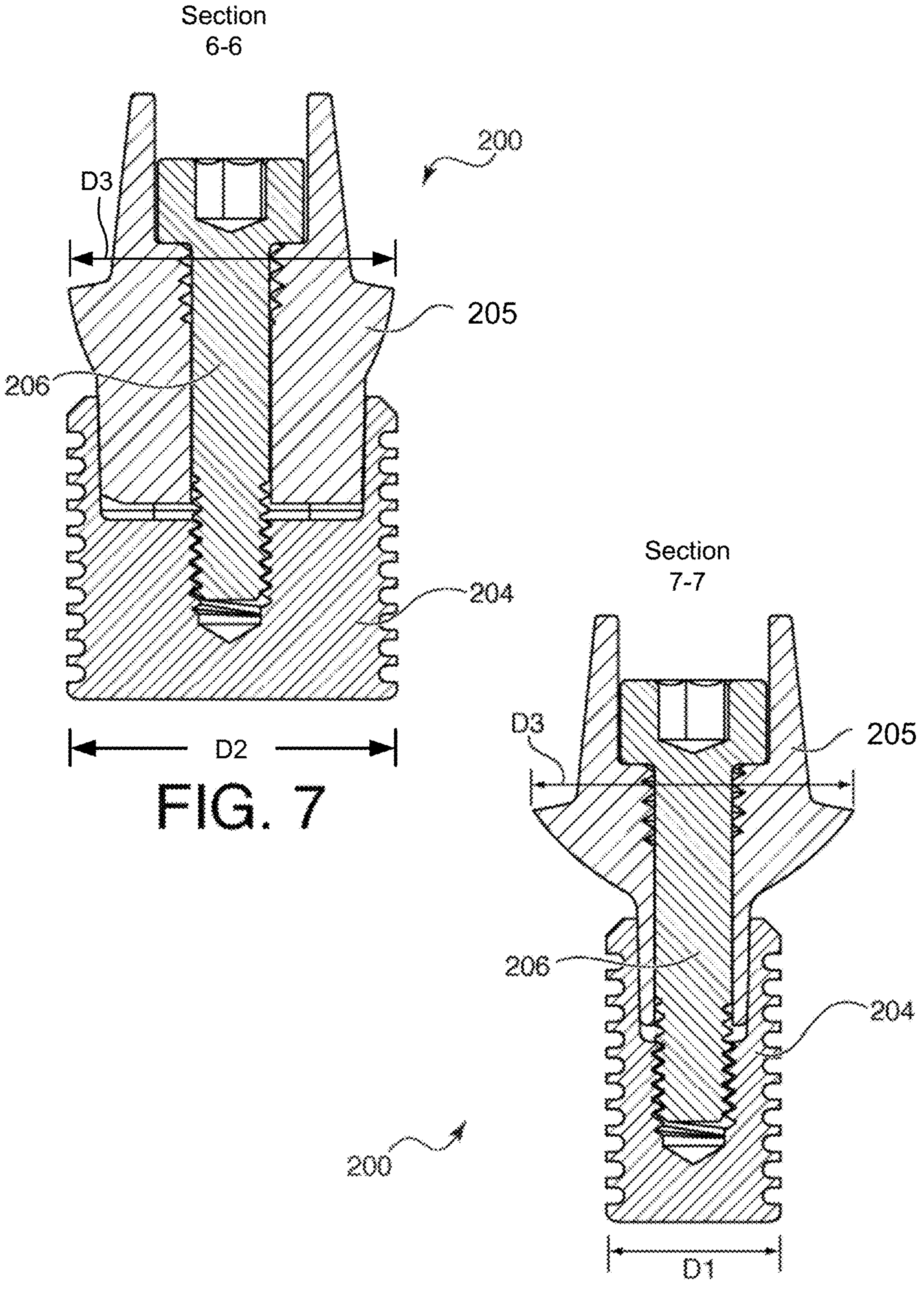
FIG. 7 shows a front cross-sectional view of FIG. 6.
FIG. 8 shows a side elevational cross-sectional view of the dental implant assembly of FIG. 5.

Referring now to FIGS. 5-8, there is shown an alternate dental implant assembly 200. This assembly 200 includes an abutment member 205, a base member 204, and an optional fastener 206. A distance D2 measures the length of the base member 204, a distance D3 measures the widest portion of (in front view) of abutment member 205, while a distance D1 measures the maximum width (in side view) of base member 204. As can be seen, in some embodiments distances D2 and D3 are equal or substantially equal in some embodiments. Section marks 7-7 illustrate the direction of the cross-sectional view shown in FIG. 8, while the cross-sectional view 6-6 shown in FIG. 7 is taken from a front view which is rotated 90 degrees from the cross-section of FIG. 8. The base member 204 is illustrated in more detail by FIGS. 9A-12. The abutment member 205 is illustrated in more detail by FIGS. 14-19. The fastener 206 is illustrated in more detail by FIG. 20. A removal tool 280 is illustrated in more detail by FIG. 21.

Base Member

Referring now to the base member 204 shown by FIGS. 9A-12, the base member 204 may be configured to be press fit or cemented into place with respect to a patient's jawbone 112. The base member 204 may be commonly referred to as a "basket" by some physicians because its cavity is shaped like a basket made to hold the lower portion of an abutment. The base member 204 has an eccentric (rounded, but non-circular) shape, which can prevent it from twisting upon application of torque once implanted. The base member 204 defines a lower bone-contacting surface for the dental implant assembly 200. The lower bone-contacting surface is illustrated as having substantially parallel elongated side walls 208 (e.g., parallel to one another), curved end walls 210 which oppose each other, and a flat base 212 (which is solid bottom surface/wall of base member 204, without an opening therethrough or extensions or securement members extending further downward therefrom, and which couples with the continuous bottom eccentric edge of the external surface 215 formed by the coupled side walls 208 and curved end walls 210).

Figures 9A, 9B, 10:
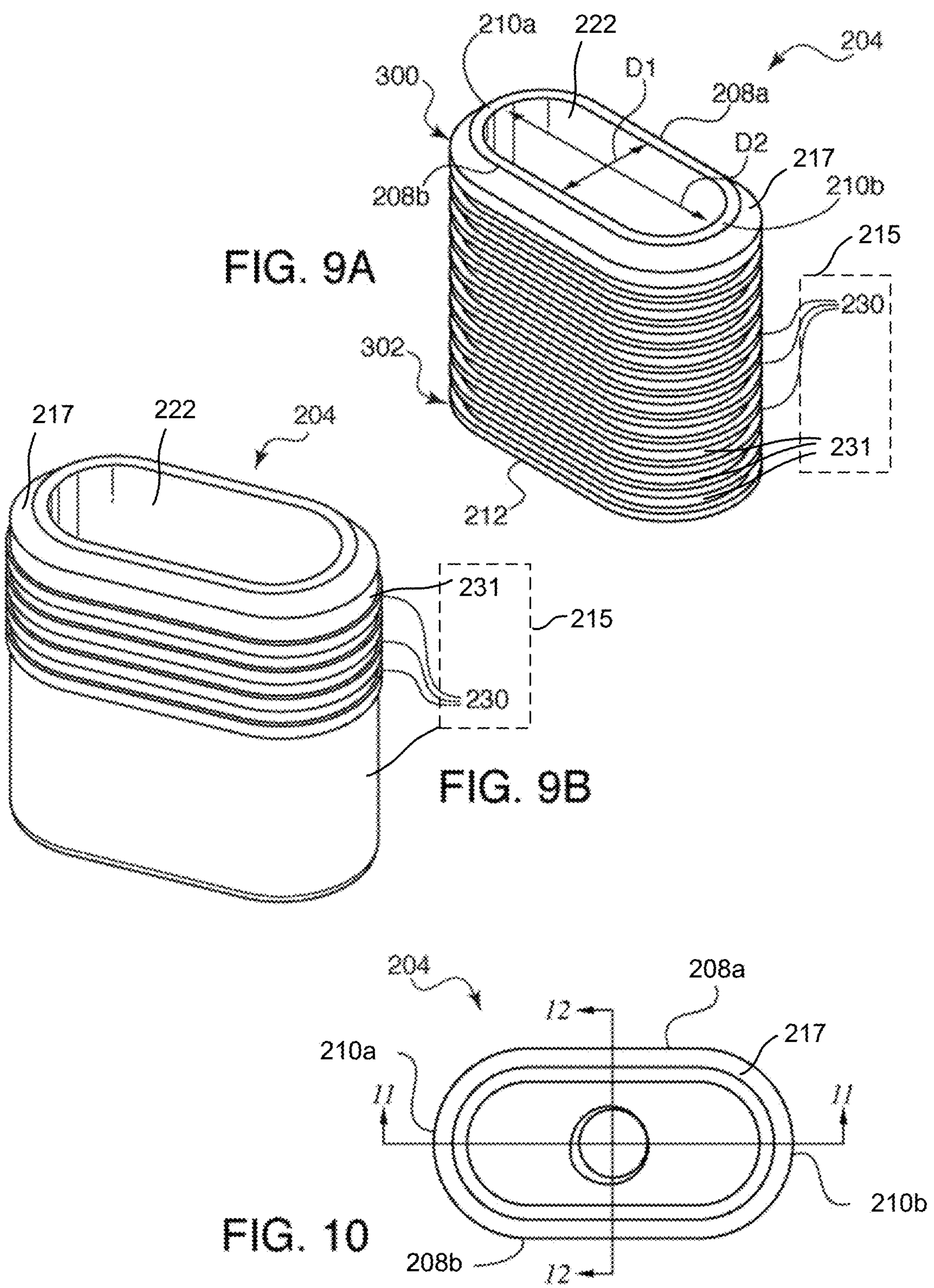
FIG. 9A shows a perspective view of a base member of the dental implant assembly of FIG. 5.
FIG. 9B shows a perspective view of an alternate version of the base member of FIG. 5 with partial ridges as compared to the base member illustrated in FIG. 5 and FIG. 9A.
FIG. 10 shows a top plan view of the base member of FIG. 9A.

As is shown by the perspective view of FIGS. 9A and 9B and the top plan view of FIG. 10, the base member 204 has a rounded but non-circular shape. This non-circular shape may be envisioned as being created by the following steps: longitudinally bisecting a cylinder, then moving the two resultant half-cylinders apart by some measurement that may vary, then filling the intervening gap with material to seamlessly bond the two sides together. For example, as shown by FIG. 9A, there are two elongated side walls 208*a*, 208*b*, separated a distance D1 from one another. The elongated side walls 208*a*, 208*b* are substantially parallel to one another. The elongated side walls 208*a*, 208*b* are each bounded at the end by curved opposing end walls 210*a*, 210*b* which are coupled with the elongated side walls. The outer surfaces of the two curved end walls 210*a*, 210*b*, separated a distance D2 from one another, while the outer surfaces of the elongated side walls 208*a* and 208*b* are separated by a distance D1 from one another. Although referred to as separate "walls," it should be understood that the base member 204 is formed as a seamless, integral component. The oblong, non-cylindrical shape of the base member 204 prevents it from twisting within the patient's bone cavity upon application of torque by an oral surgeon or other practitioner. This resultant shape exhibits semicircular profiles defined by curved end walls 210 at the ends with parallel elongated side walls 208 connecting the ends. FIG. 9A shows ridges 230 (described further below) that extend the entirety of the outer surface of the base member 204. FIG. 9B shows ridges 230 that only cover an upper portion of the base member 204. In some embodiments, concentric grooves 231 are present between the concentric ridges 230 on at least a portion of the base member 204 (some portions may be smooth). Together any combination of concentric ridges 230, concentric grooves 231, and any smooth portions define an overall eccentrically shaped external surface 215 which is collectively formed by walls 208*a*, 208*b*, 210*a*, and 210*b*. Although not shown, it should be understood that ridges 230 and grooves 231 may extend only along a lower portion of the base member 204, they may be sporadic along the external surface 215, or no ridges 230/grooves 231 need be present at all. All options and variations thereof are considered within the scope of this disclosure. Although ridges 230/grooves 231 may be included in various combinations, they are not screw threads as base member 204 is configured to be press-fitted or else pushed into and cemented into a prepared opening, without being spun as it is seated into the opening. FIG. 10 shows a top view with markings for a lengthwise cross-section 11-11 and a widthwise cross-section 12-12.

In one embodiment, the base member 204 may exhibit surfaces on all sides that are aligned parallel to a longitudinal axis 214. The side walls 208 may be straight, parallel side walls. (Although referred to as "parallel," it should be understood that some degree of manufacturing tolerances should be considered within the scope of this term. It is possible that a slight taper may be present within the walls. To an ordinary observer, the walls 208 will appear substantially parallel to one another, and walls 210 will appear substantially parallel to one another at their distal-most points.) It is envisioned that straight or parallel side walls (while maintaining the eccentric shape of the basket when viewed from a top down perspective), can further increase the bone-contacting surface of the base member 204. This increase in bone-contacting surface can enhance overall implant stability and improve the osseointegration process. Moreover, providing elongated parallel side walls 208 with opposing curved end walls 210 can be more conducive to performing a straightforward osteotomy.

Additionally, or alternatively, the walls need not be parallel. If the walls are not parallel to one another, then the top perimeter 300 of the base member 204 should match the bottom perimeter 302 of the base member 204. In other words, the disclosure does not require straight parallel walls, but that the overall implant assembly 200 fits vertically within the osteotomy that is shaped according to the above description. As long as the bottom perimeter 302 of the implant conforms to the prepared osteotomy shape and the top perimeter 300 of the implant conforms to that same shape, the areas in between (vertically) the top and bottom perimeters may be pinched inward, angled inward, concave, wavy, or be provided in any other configuration or shape without compromising the advantages of the design. (Although it should be understood, however, that the areas in between top and bottom perimeters 300, 302 should not bow outward in any fashion, because that would prevent the overall implant assembly 200 from fitting within the specific geometry of the osteotomy as described.) Examples of these options are illustrated by FIGS. 22A-24 and are considered within the scope of this disclosure.

Alternatively, FIGS. 25A-25D illustrate an alternate embodiment in which the top perimeter 300 and the lower perimeter 302 of the base member 204 match. In this embodiment, the elongated side walls 350 are not parallel to one another because the end walls 352 do not share the same radius of curvature. In the examples shown, end wall 352*a* has a smaller radius of curvature than end wall 352*b*. The openings formed in the patient's bone to receive these differently sized end walls 352*a*, 352*b* may be created using differently sized drill bits or burrs, as described in more detail below. The different radii of curvature cause the elongated walls 350 to taper away from one another as they reach curved end wall 352*b*. However, because the walls 350 define the same consistent shape along the perimeter of the implant, as illustrated by the top plan view of FIG. 25C, the top perimeter 300 has the same shape as the bottom perimeter 302.

Figure 22A:
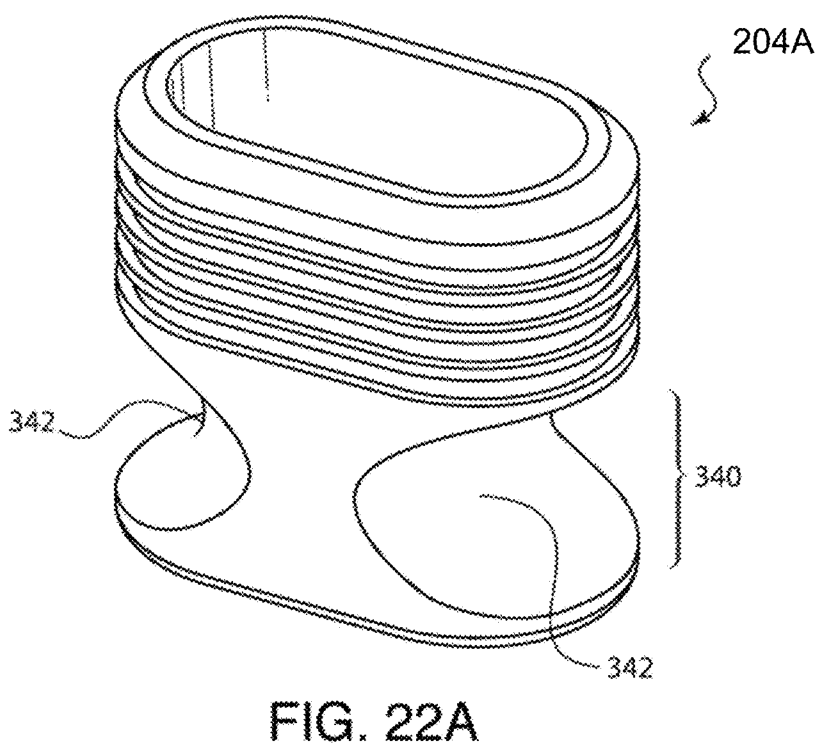
FIG. 22A shows a perspective view of an alternate base member having an inward taper at its lower portion.
Figure 22B:
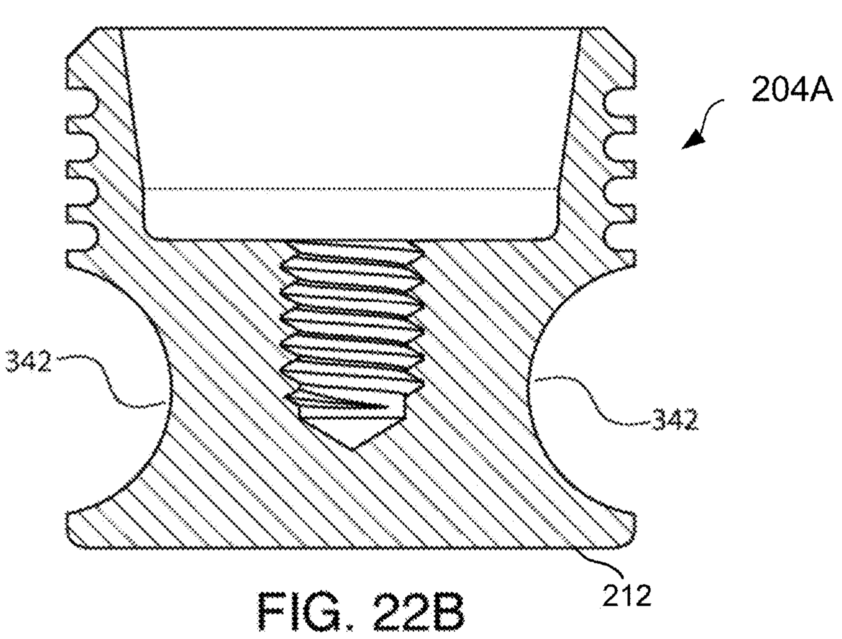
FIG. 22B shows a front cross-sectional view of the base member of FIG. 22A.
Figure 23A:
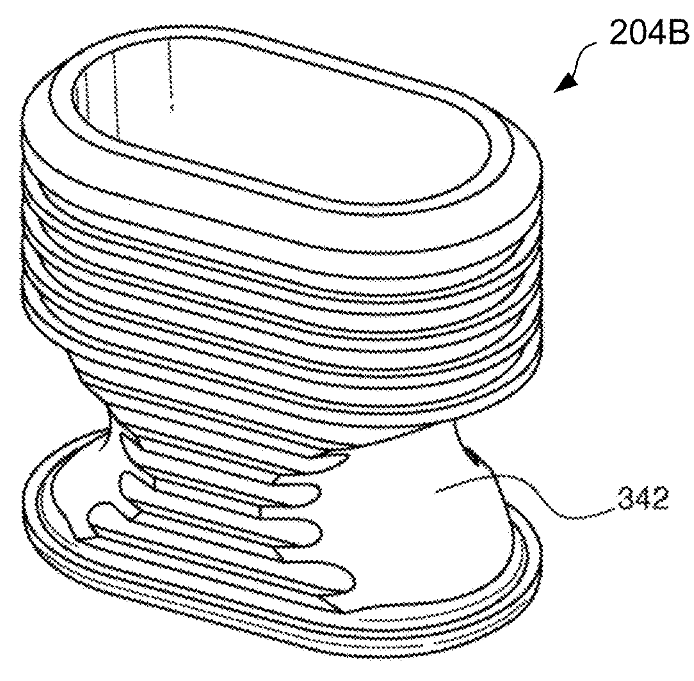
FIG. 23A shows a perspective view of an alternate base member having an inward taper at its lower portion, having ridges along an entire face of its elongated wall.
Figure 23B:
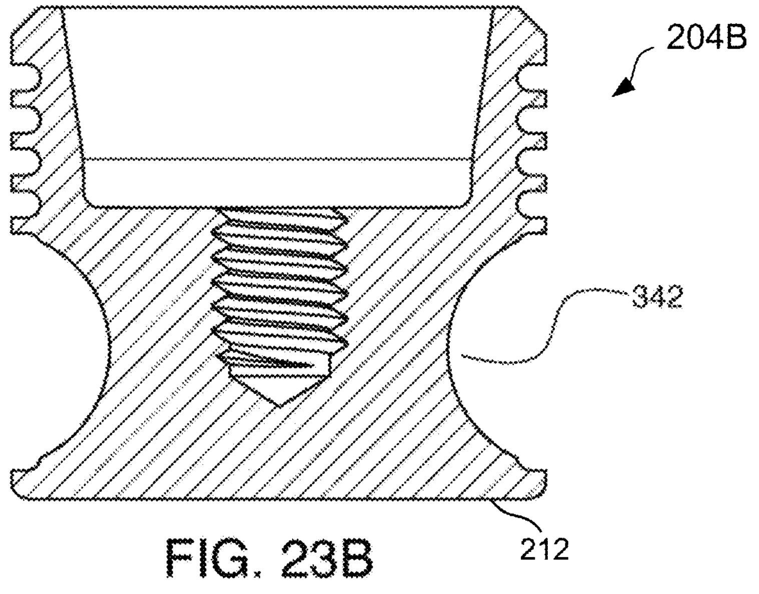
FIG. 23B shows a front cross-sectional view of the base member of FIG. 23A.
Figure 24:
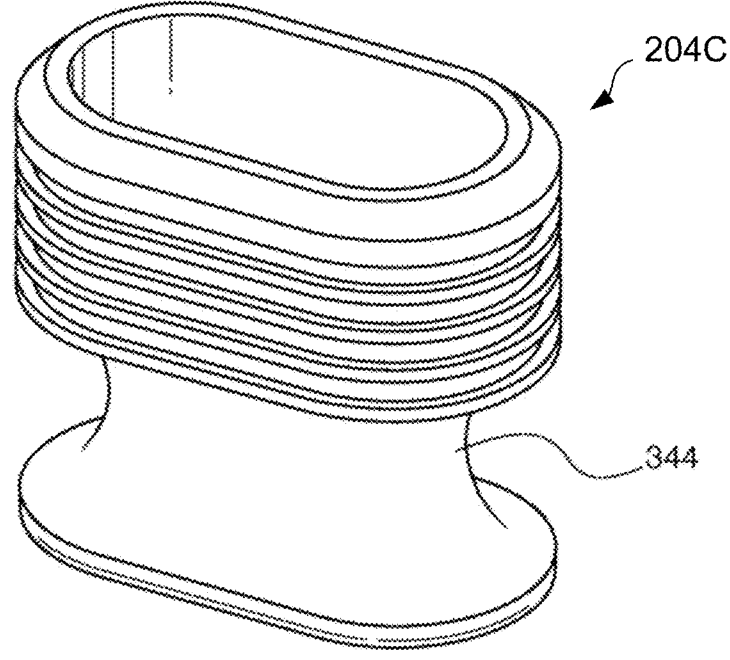
FIG. 24 shows a perspective view of an alternate base member having an inward pinched portion at its lower portion.

FIGS. 22A and 22B illustrate alternative options of symmetrical top and bottom perimeters 300, 302 of a base member 204A. In this example, the lower portion 340 of the base member 204A illustrates an inward taper 342 at the location of curved side walls. The elongated side walls feature an upper ribbed portion and a lower un-ribbed portion. FIGS. 23A and 23B illustrate a similar inward taper 342 in alternative base member 204B but show that the elongated side walls may exhibit a ribbed portion along their entire surface. Although not illustrated, it is also possible for the ribbed portion to extend into the inward taper 342 areas. FIG. 24 illustrates, with alternate base member 204C, that a complete internal pinch 344 is also an option in some embodiments. In all of these examples, the top perimeter 300 and the lower perimeter 302 all match in size. This allows the dental implant assembly 200 to be positioned into the shaped bone, methods for which are described below.

Figure 11A:
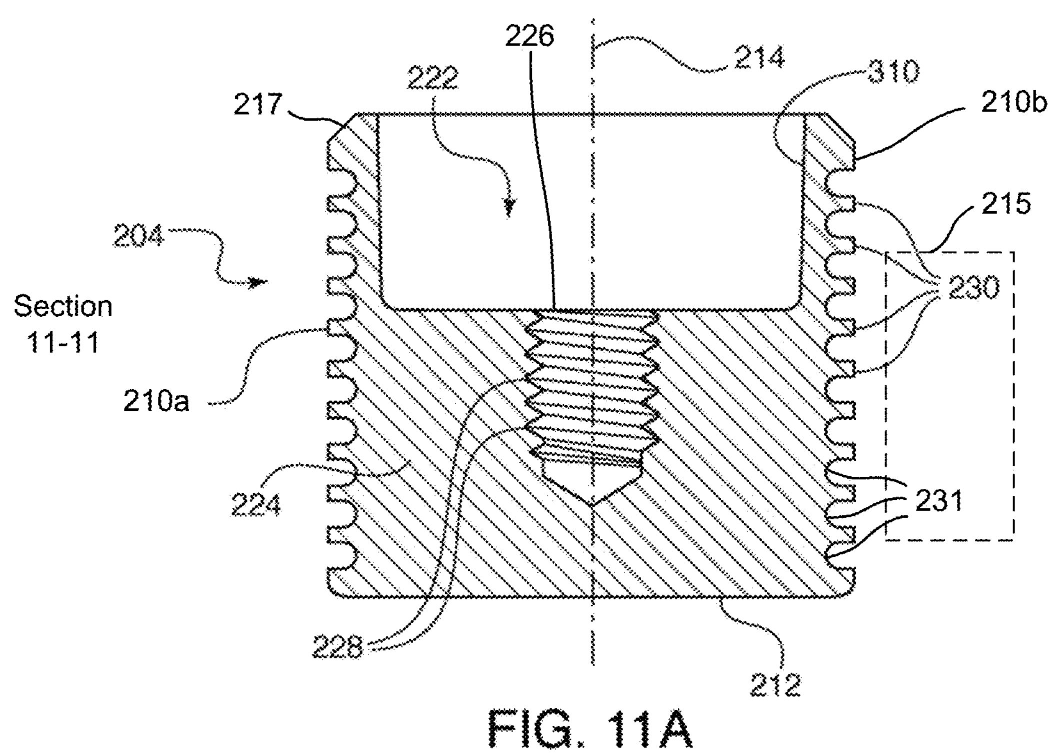
FIG. 11A shows a front cross-sectional view of the base member of FIG. 9A.
Figure 11B:
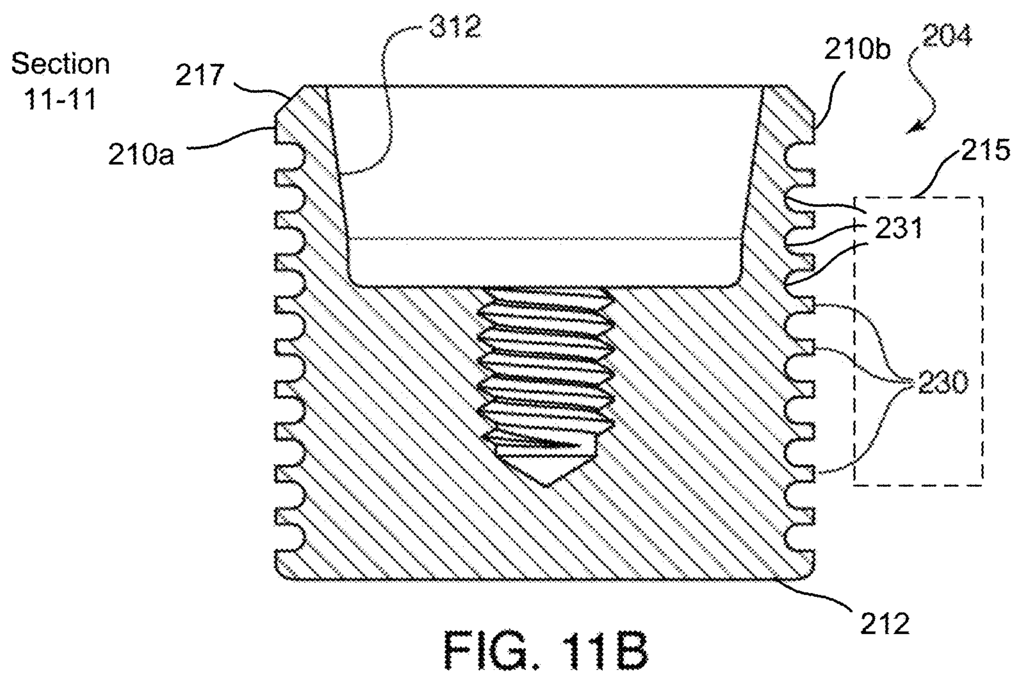
FIG. 11B shows a front cross-sectional view of an alternate base member, to that of FIG. 9A, having an internal cavity with tapered walls.
Figures 11C, 12, 13:
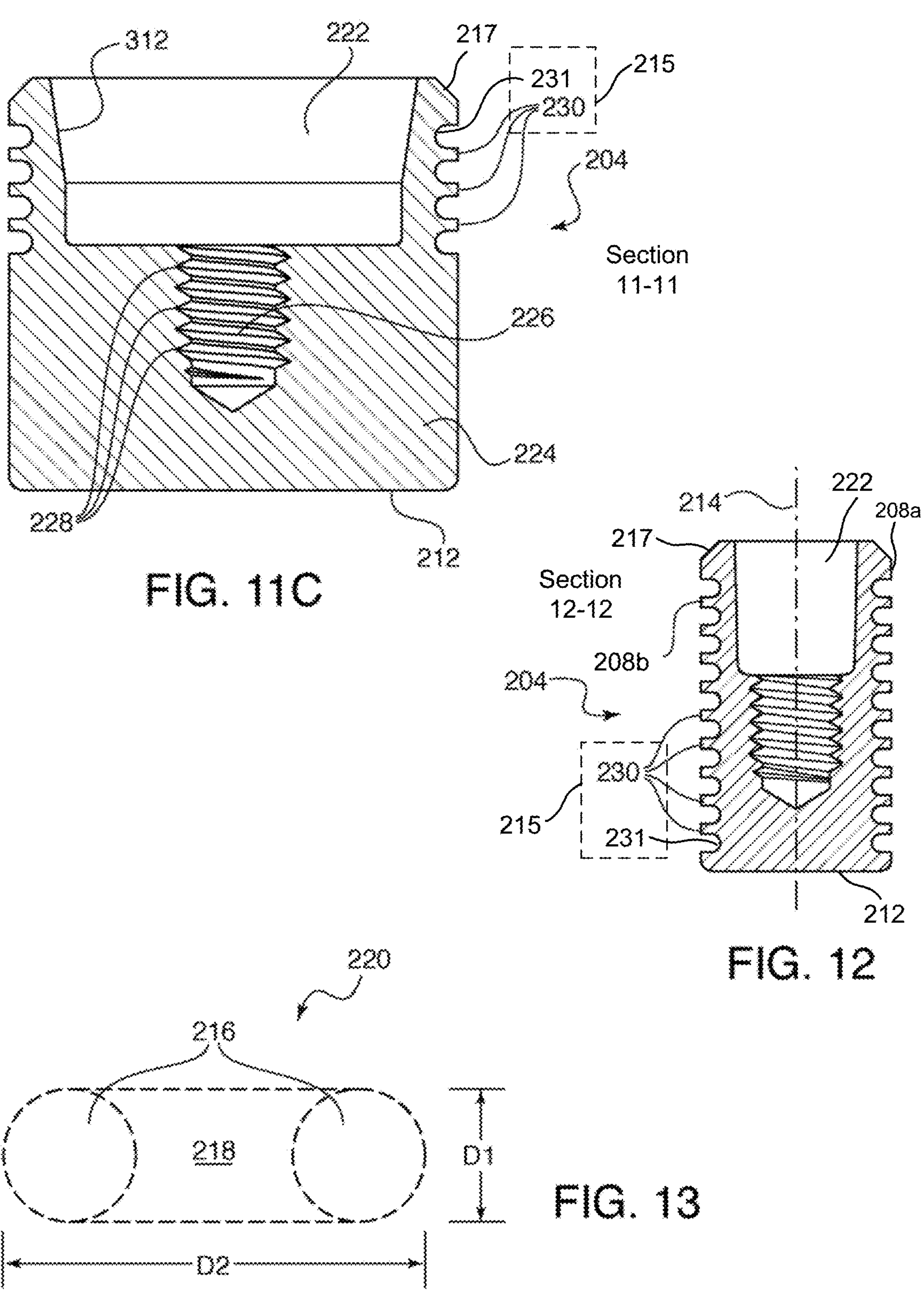
FIG. 11C shows a front cross-sectional view of the base member of FIG. 9B, with partial ridges.
FIG. 12 shows a side cross-sectional view of the base member of FIG. 9A.
FIG. 13 shows a schematic of various burr cuts that may be made in a patient jawbone in order to receive the dental implant assembly of FIG. 5.

For example, in prior art implants that had a circular base, a practitioner would drill a receiving opening in the patient's bone sized to receive the circular base. Because prior art implants had a circular base, the base was positioned directly into the circular receiving opening created by the drill. The disclosed base member 204 may be implanted similarly, with minor modifications. Drilling steps are illustrated by FIG. 13.

For example, because there is no drill designed to create an oblong opening within a patient's bone, a plurality of drill bits may be used in order to create the appropriately shaped opening 220, which is generally flat on its bottom. For example, the opening to receive the semicircular end walls may be created using circular drill bits or burrs. In one example, such circular drill bits may be trephine drills or burrs. The burr selected is sized to match the curvature of the curved end walls 210*a*, 210*b*. In one example, these circular openings are illustrated as reference numerals 216 in FIG. 13. These openings 216 are generally drilled so that the opposite ends of the opening are a distance of about D2 from one another (or slightly smaller if the dental implant assembly is to be press fit into place). Because these openings 216 will ultimately be connected, the relevant portion drilled is the outer half circle or semicircle shaped to receive the curved end wall 210. Additionally, in the embodiments in which the elongated side walls 208 are parallel to one another, and the curved end walls 210 have the same radius, the same sized drill bit or burr may be used to prepare the openings 216.

However, in embodiments in which the elongated side walls 350 are not parallel to one another and the curved end walls 352 have different radii, as illustrated by FIGS. 25A-25D, different sized drill bits or burrs may be used to prepare these openings. For example, referring to FIG. 25D, a first drill bit size may be used to create opening 330 and a second drill bit size may be used to create opening 332.

Regardless of how the end wall openings are created, next, a straight wall burr may be used to connect the two openings 216 (or 330, 332). The trench or channel created is represented by reference 218 in FIG. 13. This channel 218 is generally drilled so that opposite walls are a distance of about D1 from one another (or slightly smaller if the dental implant assembly is to be press fit into place). The collective drilling steps create the oblong, eccentric, or otherwise noncircular opening 220 illustrated by FIG. 13. This opening 220 is thus sized and shaped in order to receive the base member 204 of FIGS. 9A-12. The opening 220 has parallel side walls and curved end walls that correspond to elongated side walls 208 and curved end walls 210 of the base member 204.

Figure 25A:
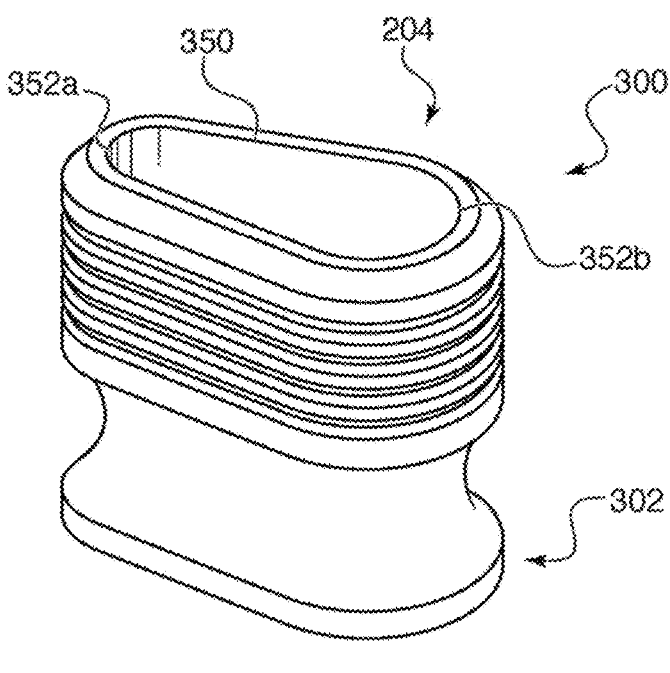
FIG. 25A shows a perspective view of an alternate base member having different radii of curvatures at its curved ends, with an inward pinched portion at its lower portion.
Figure 25B:
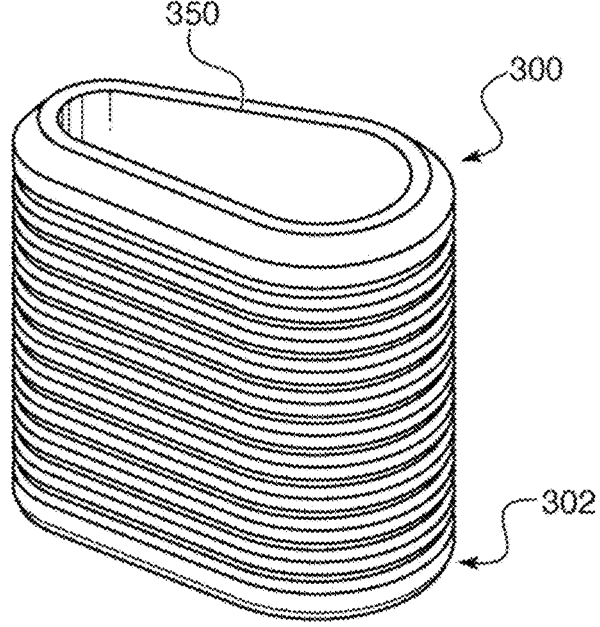
FIG. 25B shows a perspective view of an alternate base member having different radii of curvatures at its curved ends, with parallel walls in the same axis from the top perimeter to the bottom perimeter.
Figure 25C:
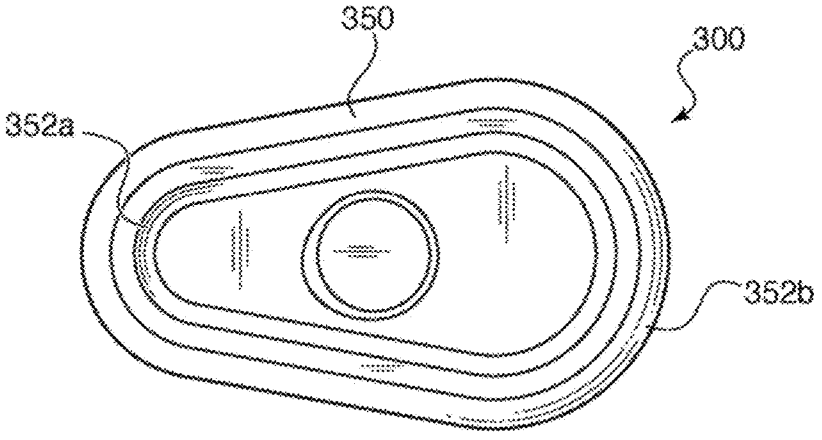
FIG. 25C shows a top plan view of the base member of FIG. 25A and similarly of the base member of FIG. 25B.
Figure 25D:
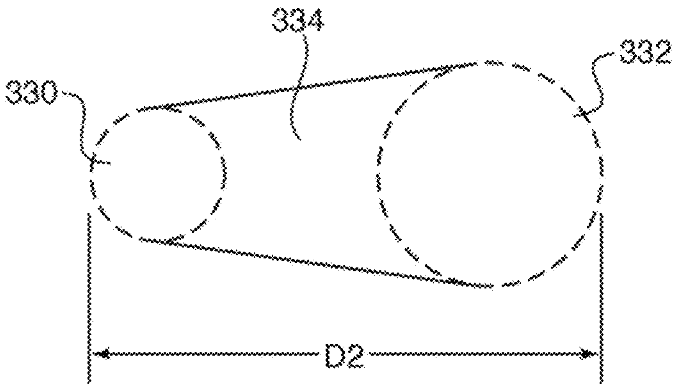
FIG. 25D shows a schematic of shows various burr cuts that may be made in a patient jawbone in order to receive the dental implant assembly of FIGS. 25A-25C.

Referring now to FIG. 25D, the channel 334 may also be drilled so that the openings are a distance D1 from one another. However, because the openings 330, 332 in this embodiment are sized differently, the channel may have outwardly tapering walls, matching the outwardly tapering elongated walls 350 of the base member of FIGS. 25A-25C. In both methods illustrated by FIGS. 13 and 25D, the resulting opening created in the patient's bone is sized to receive an appropriate base member 204. Whichever base member 204 is used, it should be understood that the top perimeter 300 and the bottom perimeter 302 are the same shape as the osteotomy created.

Figures 14, 15, 16:
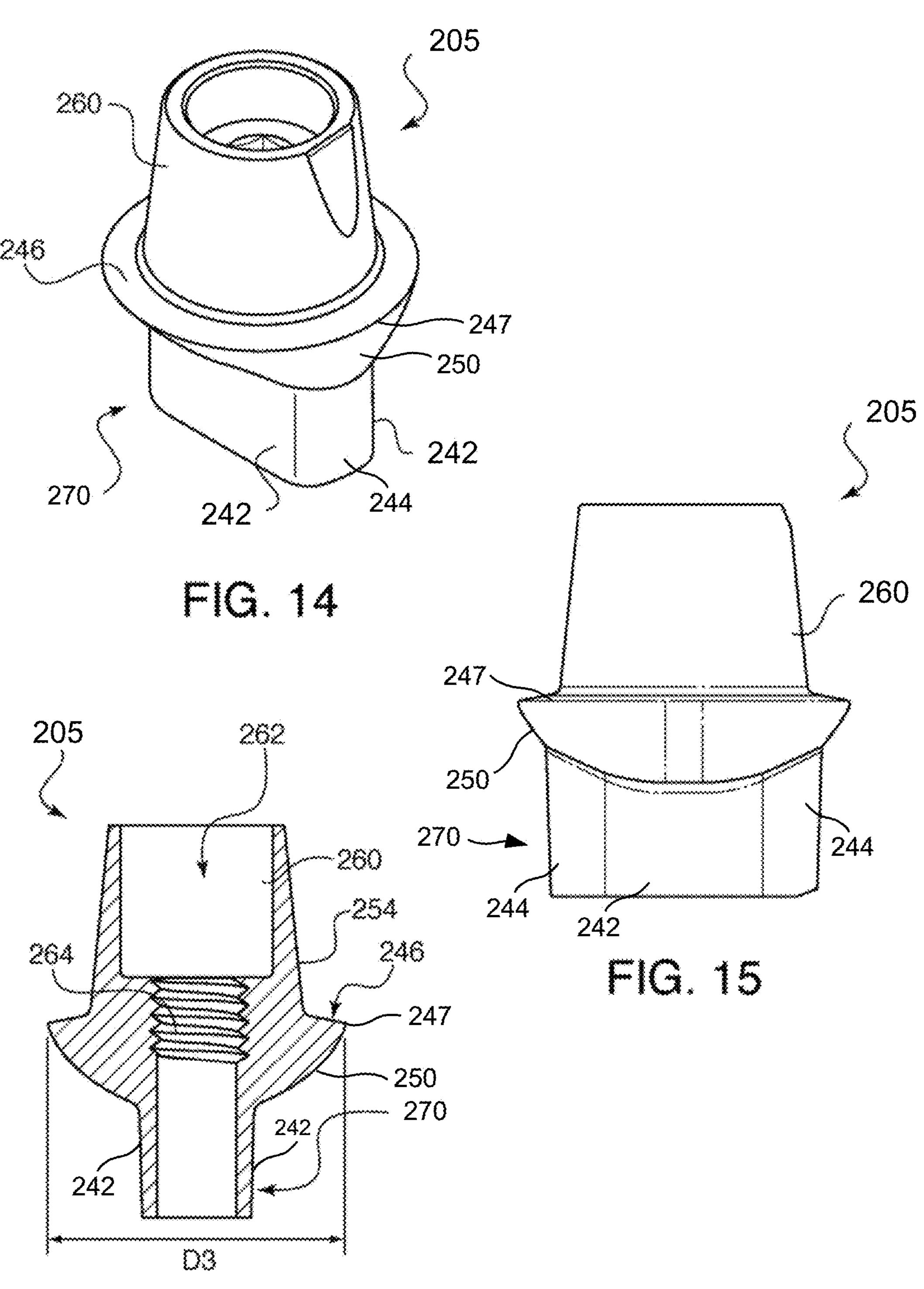
FIG. 14 shows a perspective view of an abutment member of the dental implant assembly of FIG. 5.
FIG. 15 shows a front elevational view of the abutment member of FIG. 14.
FIG. 16 shows a side cross-sectional view of the abutment member of FIG. 14.

Referring now to FIGS. 9A, 9B, 11A and 11B, it can be seen that the base member 204 has an internal cavity 222 which is defined by side walls 208*a*, 208*b*, 210*a*, and 210*b*. This internal cavity 222 is eccentric in shape (the eccentric shape may be oval or another non-circular shape in various embodiments) and is sized to receive the abutment member 205, described further below. As shown by cross-section 11-11 in FIG. 11A, if the abutment member has a lower portion with parallel side walls 242 (as shown by FIGS. 14-16), the cavity 222 may have corresponding internal parallel walls 310. As shown by cross-section 11-11 in the alternative embodiment of FIG. 11B, if the abutment member has a lower portion 270 with tapered walls 322 (as shown by lower portion 270*b* of FIG. 17), the cavity 222 may have corresponding internal tapered walls 312. A lower portion of the base member 204 may be solid material 224. Extending into solid material 224 is a receiving channel 226. As shown and in specific embodiments, the receiving channel 226 may have internal threads 228 that correspond to and receive threads 272 on the fastener 206 (shown by FIG. 20 and also described further below). The base 212 (e.g., the bottom wall) of the base member 204 is illustrated as being a solid base without an opening therethrough or extensions or securement members extending further downward therefrom. Such an embodiment may be designed to be press fit or cemented into place, rather than being secured with a securement member. Alternate base members, however, may be configured with a threaded channel that extends completely through the base that can receive an elongated fastener, which can function as a securement member. These embodiments of base members may thus have a base opening extending through the base 212 for receiving the securement member.

The base member 204 is also illustrated as having a plurality of external grooves or ridges 230 along its outer cross-section. It should be understood that various ridge shapes and sizes are possible and considered within the scope of this disclosure. In one example, the ridges 230 may be stepped ridges. In other examples, the ridges 230 may define a variety of square or triangular staircase-like configurations, which includes soft or rounded versions of these configurations. The ridges 230 may improve bone integration by providing increased surface area and distribution of stress/load. The ridges 230 may be surface treated. Such surface treatments may be in addition to or instead of the external ridges 230. In one example, ridges 230 and/or the external surface of the base member 204 may have a micro blasted or etched surface in order to encourage bone ongrowth. These surface treatments may help improve bone integration. This may be accomplished in a number of ways. One example includes additive processes, such as plasma spraying or other types of coating. Another example includes subtractive processes, such as acid-washing or bead blasting. A further surface treatment that is possible includes a layer of polyether ether ketone (PEEK) applied to the external surface area in contact with bone. The ridges or grooves may be applied to the entire outer surface, as shown by FIG. 11A. The ridges or grooves may only be applied to a portion of the outer surface, as shown by FIG. 11B.

With reference to FIGS. 9A, 9B, 11A, and 11B, it can be seen that an eccentrically shaped curved lip 217 couples the internal cavity 222 with the external surface 215 of base member 204.

Abutment Member

In addition to the base member, the disclosed dental implant assembly 200 also provides an abutment member 205 that functions in cooperation with the base member 204. FIGS. 14-19 illustrate various views of an exemplary abutment member 205. As shown by the cross-sectional views of the assembled dental implant assembly 200 of FIGS. 5-8, the abutment member 205 may nest or otherwise fit within the internal cavity 222 of the base member 204. Specifically, the abutment member 205, in various embodiments has a lower portion 270 with elongated side walls 242 and curved end walls 244, both of which have outer surfaces that correspond to inner surfaces of the elongated side walls and curved end walls 210, respectively, of the base member 204. In use, the lower portion 270 of the abutment member 205 is positioned within the internal cavity 222 of the base member 204. In some embodiments, in plan view, the eccentric shape of internal cavity 222 and of external surface 215 may be referred to as oval in shape, while in others it may be referred to as a stadium or obround in shape as it is essentially a rectangle with semi-circular ends. This positioning may be accomplished by a press fit, friction fit (with very slight internal tapers of one or more of the walls 208, 210, 242, and/or 244) such that the abutment member 205 may be securely positioned into place with respect to the base member 204. (A fastener 206 may also be used in order to secure abutment member 205 and base member 204 to one another, as is described further below.) The abutment member 205 of FIGS. 14-16, 18, and 19 has parallel side walls 242 at its lower portion 270, which are coupled with opposing curved end walls 244. FIG. 12 shows a side cross-sectional view 12-12 of the base member of FIGS. 9A and 11A, where the internal cavity 222 has no discernable inward taper.

The abutment member 205*b* of FIG. 17 shows an alternative version which has a slight taper to the walls 322 at its lower portion 270*b* which are configured to engage with the slight taper of the internal cavity of alternate base members such as those shown in FIG. 11B and in FIG. 11C (which is a similar cross-section of FIG. 9B). The internal walls 310, 312 of the cavity 222 of the base member 204 will thus be shaped accordingly to work with its complementary abutment member (i.e., either with straight walls or walls with a slight taper).

Figures 5, 6:
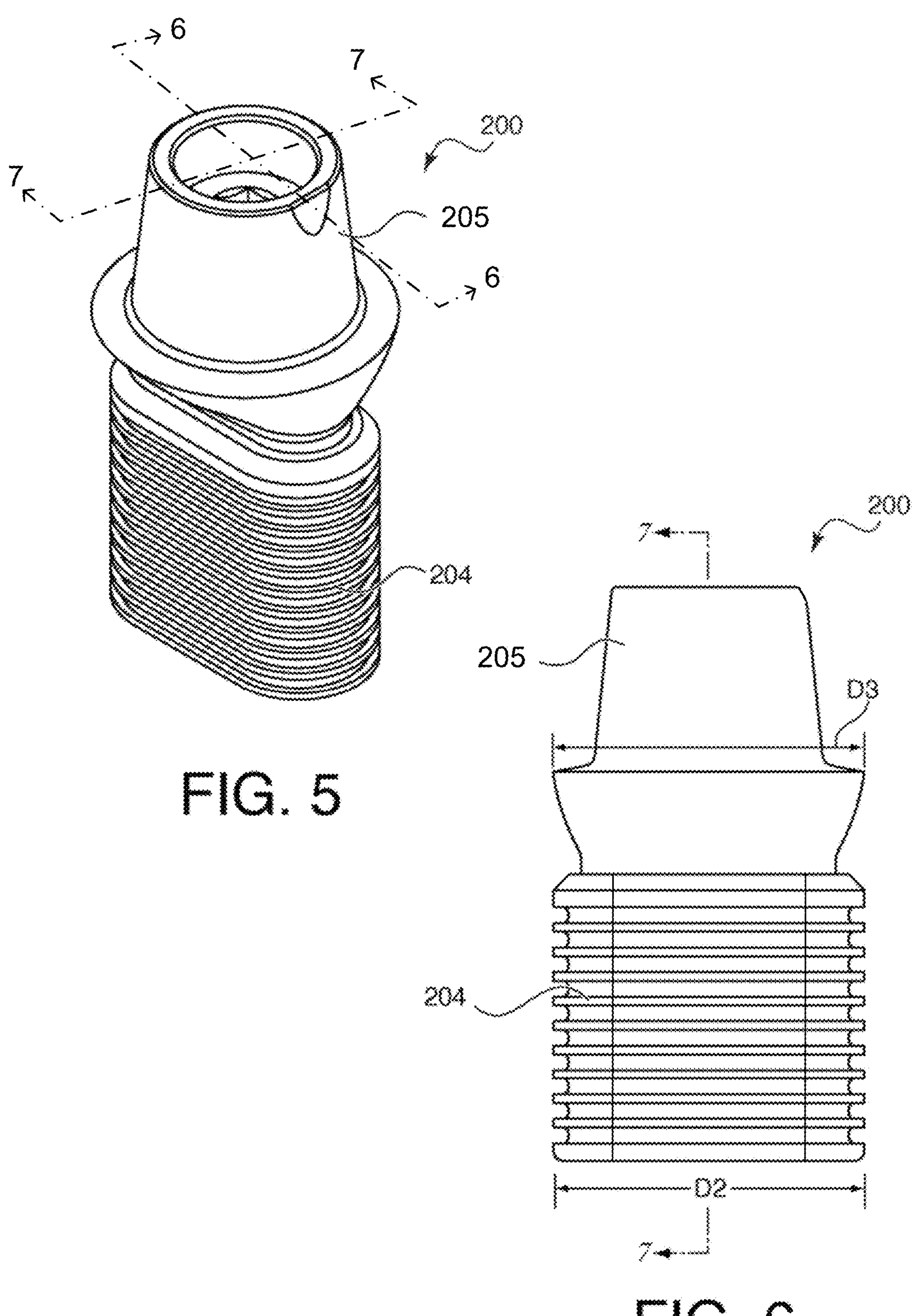
FIG. 5 shows a side perspective view of an alternate dental implant assembly described herein.
FIG. 6 shows a front elevational view of the dental implant assembly of FIG. 5.

The abutment members 205 of FIGS. 14-19 are also shown as having an upwardly curved shoulder 246 which has an outer/distal curved perimeter edge 247. The shoulder 246 and curved perimeter edge 247 circumscribe the abutment member 205 and may be circular or eccentric when viewed from the top downward. This upwardly curved shoulder 246 has a first elongated dimension D3 (as illustrated in FIGS. 6, 7, and 8) that is generally similar in length to the distance D2 between the curved end walls 210 of the base member 204. In other words, the shoulder 246 does not extend past the profile of the curved end walls 210. This is illustrated by FIGS. 6 and 7. Upwardly curved shoulder 246 is larger in length/width D3 than the distance D1 between elongated side walls 208 of the base member 204. In other words, in some embodiments, the shoulder 246 may extend past the profile of the elongated side walls 208 but may not extend past the profile of curved end walls 210. This is illustrated by FIGS. 7 and 8. This extended portion of the shoulder 246 can rest against tissues of the opening created in the patient's bone.

An upper surface of the shoulder 246 has an inward and upper chamfer while the upper portion 260 has a surface 254 with an inward taper. These inward/upper tapers are shaped as illustrated by FIG. 16 as shoulder 246 extends up to form upper portion 260 of the abutment member 205. The upper portion 260 is shaped and configured to support a dental restoration such as crown (e.g., crown 2670 of FIG. 26A).

Extending through the entirety of the abutment member 205 is an internal channel 262. As illustrated by FIGS. 16 and 19, dimensions of the internal channel 262 may have a larger circumference at the upper portion 260 and a smaller circumference at the lower portion 270. This can allow seating of the fastener head 276. In some embodiments, a portion of the internal channel 262 is provided with receiving threads 264. Receiving threads 264, when present, are provided in order to allow the removal tool (shown by FIG. 21 and described further below) to work properly.

The dimensions shown in the below images are for illustrative purposes only. Actual dimensions will vary depending upon patient tooth size, the type/placement of the tooth being replaced, and other manufacturing considerations. Further, throughout herein, for purposes of example and not of limitation, embodiments discussed are configured for placement within the molar region of the mouth. As such, implant base members and drilled openings in the jaw are discussed as having a buccal-lingual width dimension (referred to as "D1") and a mesial-distal length dimension (referred to as "D2") which is elongated with respect to the width dimension. Considering an anterior placement, such as to replace an incisor, the axes of the implant would be rotated due to the curved nature of the dental arch. In such a placement, the long dimension (D2) of the implant and the emergence profile is generally aligned in a left-to-right direction relative to the patient, while the short dimension (D1) of the implant and the emergence profile is generally aligned in a labial-lingual direction. This alignment ensures that the elongated D2 dimension of the implant's base member and emergence profile is placed in-line with the alveolar ridge, while D1 dimension is placed aligned with the narrow cross-dimension of the alveolar ridge.

In some examples, the width (D1) of the base of the implant assembly is from about 3 mm to about 7 mm. Meanwhile the base's elongated D2 dimension can range from about 4 mm to about 12 mm. In a specific example, the width dimension is 4.5 mm while the elongated dimension is 7.6 mm.

It should be understood that this description is to provide a conceptual understanding, which does not exclude a variety of other non-circular shapes that could be manufactured. In one implementation, only the lower portion 270 of the abutment is non-circular to match the shape of the implanted base member 204, whereas the abutment shoulder 246 and upper portion 260 can be round or otherwise have a shape that does not correspond to the shape of lower portion 270. Within that overall concept, all dimensions and angles (such as the upper portion of the abutment) can vary. The platform switching design for the disclosed dental implant assembly 200 can have a variety of shapes. The general platform switching concept is that the abutment lower portion 270 is "inset" from the outer perimeter of the upper portion 260 (as illustrated by FIG. 15), and the abutment member 205 can therefore accommodate a variety of shapes, only one of which shape is shown in the implant drawings. The abutment shoulder chamfer 246 (which may also be referred to as the "abutment shelf" or "shoulder") can also vary. Generally, non-angled abutments are shown, but it is understood that angled abutments are considered within the framework of the invention (and are described and shown in the parent applications, incorporated herein by reference).

Fastener

Figures 20, 21:
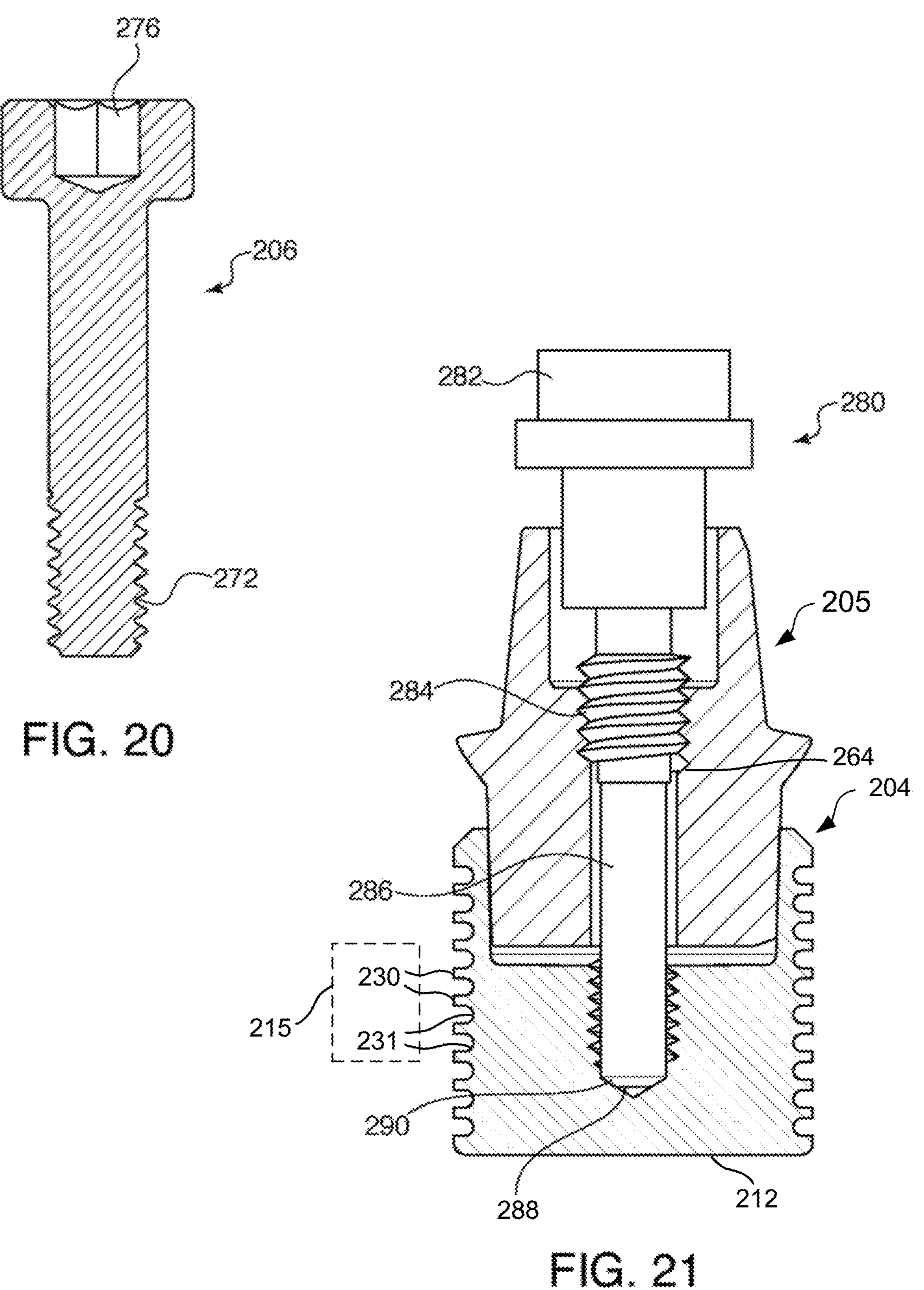
FIG. 20 shows one embodiment of a fastener that may be used in connection with a dental implant assembly of FIG. 5.
FIG. 21 shows one embodiment of a removal tool that may be used to remove the abutment member from the base member.

A fastener 206 or retaining screw may also be provided. One exemplary fastener 206 is illustrated by FIG. 20. If provided, this fastener 206 can also vary in size. Internal screw threads 228 within the base member 204 are configured to receive threads 272. A fastener head 276 may be seated with respect to an internal surface of the abutment, as illustrated by FIGS. 7 and 8. Once the abutment member 205 is placed with respect to the base member 204, the fastener 206 may be torqued into place in order to secure abutment member 205 to the base member 204. The fastener 206 also serves to help prevent any shifting of the abutment member 205 that may otherwise compromise the contacts between the abutment member 205 and base member 204. The fastener 206 prevents concentration of stress forces into small areas. Instead, it assures firm contacts comprising larger force transmission areas and reducing the likelihood of device failure associated with high force concentrations. Additional features of the fastener 206 are shown and described by the parent applications, incorporated herein by reference. (Note that some of the parent applications referred to the fastener as an implant body.)

Removal Tool

FIG. 21 illustrates a removal tool 280 that may be used to remove the abutment member 205 from the base member 204. The receiving tool may have a head 282 that can receive a driver. Threads 284 may be positioned along a shank 286. The threads 284 may engage with the receiving threads 264 of the abutment member 205. A lower bottom surface 288 of the tool 280 is provided with smooth radii 290 to help guide the shank 286. As described above, the removal tool 280 engages its threads 284 within the threads 264 of abutment member 205. The bottom of the removal tool is smooth (no threads) and is designed to push against the bottom of the threaded well within the base member 204. As the removal tool 280 is torqued into the threads 264 in the abutment member 205, the bottom of the removal tool 280 eventually contacts the bottom of the well in the base member 204 and pushes against it. This pops the abutment member 205 up without delivering force into the bone that is holding the base member 204.

Emergence Profile

Figure 26A:
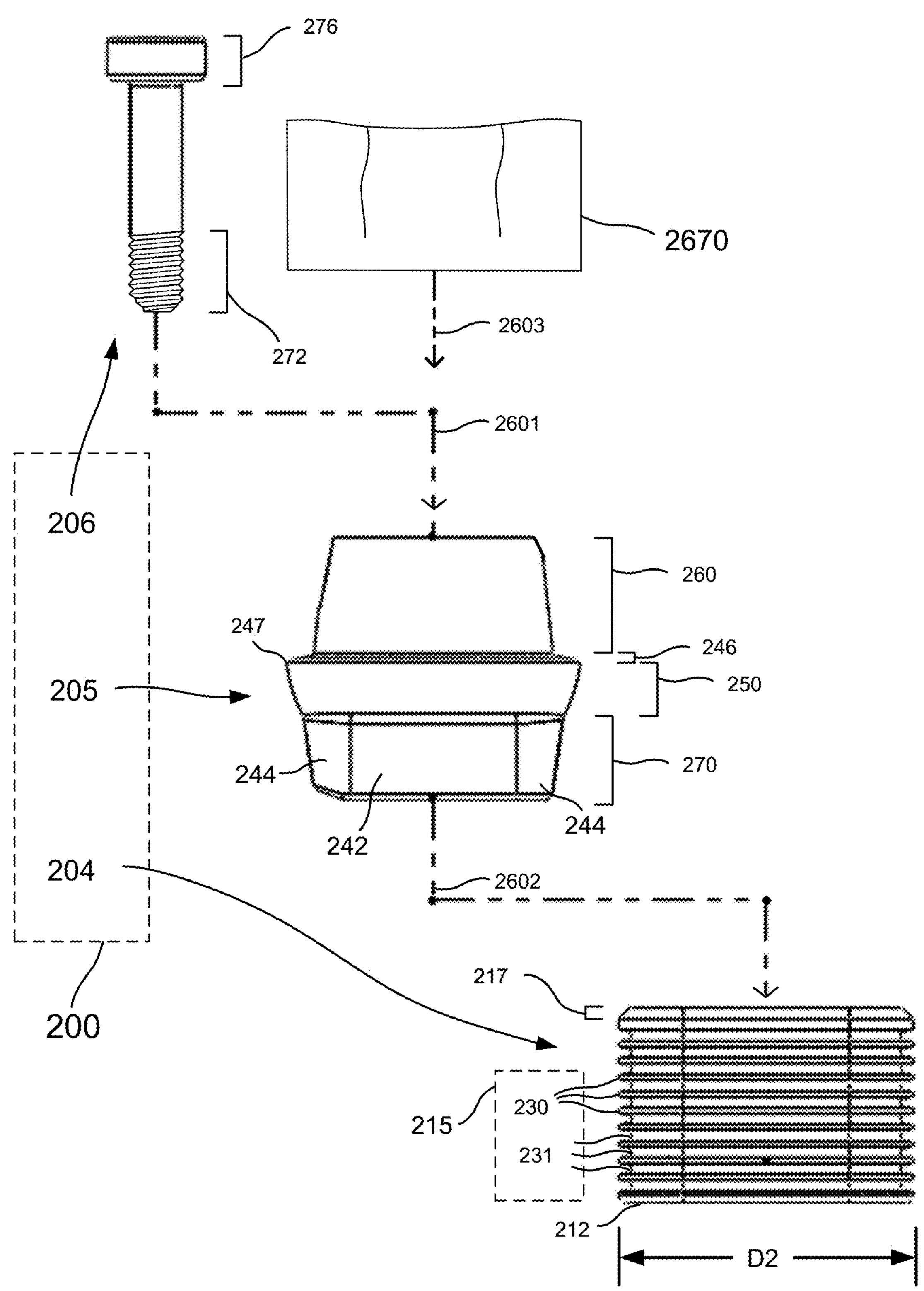
FIG. 26A shows an exploded front elevational view with assembly instructions for the dental implant assembly of FIG. 5, according to various embodiments.
Figure 26B:
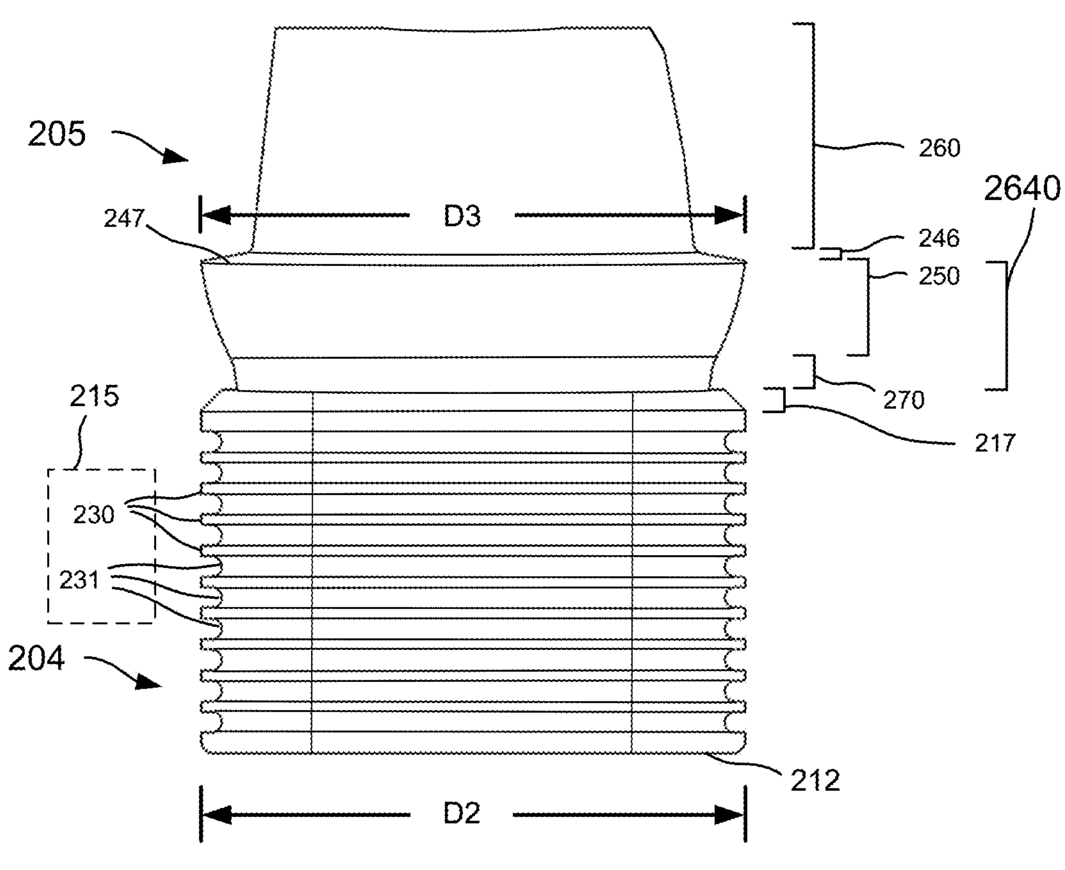
FIG. 26B shows a front elevational view of an assembled version of the dental implant assembly of FIG. 5 and is the same as the front elevational view of FIG. 6 with additional labeling to detail aspects of the trans-gingival portion, according to various embodiments.
Figure 26C:
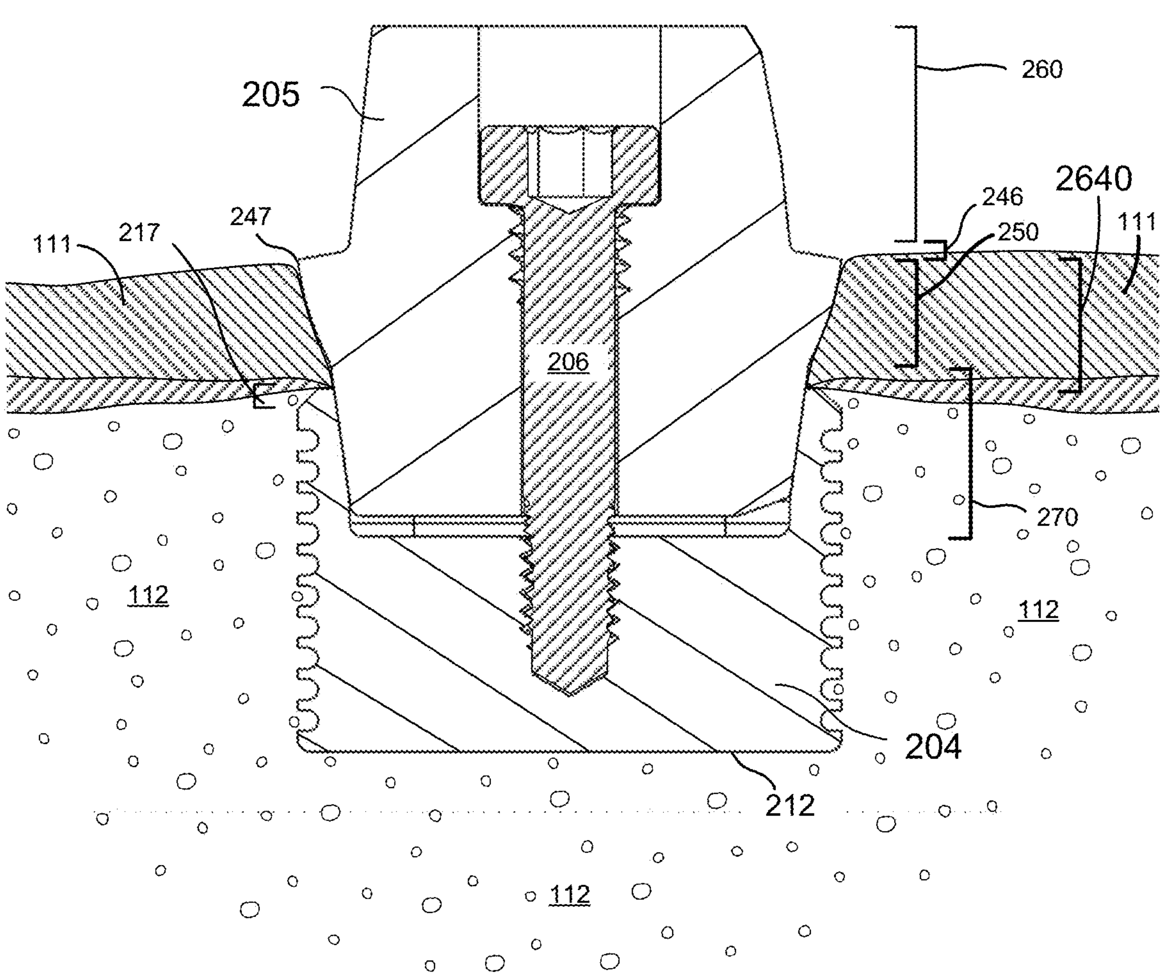
FIG. 26C shows a front elevational cross-sectional view of the dental implant assembly of FIG. 6 assembled and implanted in the jaw of a patient, according to various embodiments.

Attention is now directed to FIGS. 26A-26C and the trans-gingival emergence profile presented by the assembled dental implant assembly 200 as it emerges from bone, passes through gingiva, and transitions to the dental restoration which may be mounted atop the dental implant assembly.

FIG. 26A shows an exploded front elevational view with assembly instructions for the dental implant assembly 200 of FIG. 5, according to various embodiments. The dental implant assembly includes a base member 204, an abutment member 205, and optionally a fastener 206. The base member 204 is adapted for placement into an opening (e.g., a pre-drilled osteotomy) in a jawbone 112. As previously described, in some embodiments, base member 204 comprises elongated vertically parallel side walls (208*a*, 208*b*) coupled with opposing curved end walls (210*a*, 210*b*) which together define an eccentrically shaped external surface 215 and an eccentrically shaped internal cavity 222. An eccentrically shaped curved lip 217 couples top edge perimeters of the external surface 215 and the internal cavity 222 to one another. In some embodiments the top viewed shape (e.g., when viewed from above) of the eccentrically shaped curved lip 217 may be rounded oval, obround, racetrack, or other eccentric rounded but non-circular shape. In some embodiments, internal cavity 222 may mirror the shape and/or radius of curvature exhibited by external surface 215. In some embodiments, the internal cavity 222 slopes slightly inward as it proceeds downward from eccentrically shaped curved lip 217 toward its floor in which receiving threads 228 are defined.

An abutment member 205, which has previously been described, is shown as well. Abutment member 205 is adapted for placement into the internal cavity 222 of the base member 204. Abutment member 205 includes a lower portion 270, a shoulder 246 with a curved perimeter edge 247, an upper portion 260, and a transitional escarpment 250 located on the underside of the shoulder 246. Transitional escarpment 250 couples and smoothly translates the curved perimeter edge 247 of the shoulder 246 to the lower portion 270. As previously described, lower portion 270 is eccentric and is shaped to correspond to the eccentric shape of the internal cavity 222 of the base member 204, while upper portion 260 is shaped and adapted to receive a dental restoration 2670. It should be appreciated that while transitional escarpment 250 is very pronounced and easily distinguished in FIG. 26A, in may be less pronounced in some embodiments (e.g., for implant assemblies designed to replace incisors rather than molars) such that it blends smoothly into lower portion 270, with its main differentiator being that a small portion of it is exposed above a base when the abutment is installed into the base.

Dashed assembly line 2602 includes a directional arrow on one end which shows the direction of fitment of abutment member 205 into internal cavity 222 of base member 204. Similarly, dashed assembly line 2601 includes a directional arrow on one end which shows a direction that fastener 206 (when utilized) is installed into the assembled combination of the base member 204 and the abutment member 205.

Dashed assembly line 2603 includes a directional arrow on one end which shows the direction of fitment of a dental restoration 2670 atop of an assembled dental implant assembly 200.

As depicted in FIG. 26A and elsewhere, a fastener 206, which is adapted for insertion into an internal channel 262 of the abutment member 205, may be optionally included. Base member 204 further comprises internal receiving threads 228 within the internal cavity 222 which are configured to engage with lower threads 272 of the fastener 206. The fastener 206 further comprises a head 276 configured to engage with and seat into the abutment member 205 and to progressively compress the abutment member 205 into the base member 204 in response to progressive engagement of the lower threads 272 into the receiving threads 228 of the base member 204.

FIG. 26B shows a front elevational view of the dental implant assembly 200 of FIG. 5 and FIG. 26A and is the same as the front elevational view of FIG. 6 with the exception of the inclusion of additional labeling to detail aspects of the trans-gingival emergence profile 2640 portion of dental implant assembly 200, according to various embodiments. In response to placement of the abutment member 205 in the internal cavity of the base member 204 a trans-gingival emergence profile 2640 is formed between a top edge of the eccentrically shaped curved lip 217 and curved perimeter edge 247 of shoulder 246, and includes an exposed (i.e., visible) region of the lower portion 270 of the abutment member 205 and the transitional escarpment 250 that are between the top of the eccentrically shaped curved lip 217 and curved perimeter edge 247 of shoulder 246. The transitional escarpment 250 has a truncated cone shape (i.e., it is truncated on the bottom by the top edges of lower portion 270 and does not come to a point). In various embodiments, the cone shape may be that of a regular cone with some or all sides being straight. In other embodiments some or all of the side portions may be curved, such as with convex (i.e., outwardly bowing) curvatures or concave (i.e., slightly inwardly bowing) curvatures. As depicted, the cone shape has slightly outwardly bowed convex surfaces which reduce or eliminate undercuts/voids which can entrap food as compared to conventional dental implant assemblies.

The transitional escarpment 250 and the assembled components of the trans-gingival emergence profile 2640 have only minor rotational symmetry when rotated horizontally around a vertical axis with respect to FIG. 26B. More particularly, there is only rotational symmetry with 180 degrees of horizontal rotation. In some embodiments, transitional escarpment 250 and the assembled components of the trans-gingival emergence profile 2640 may exhibit no rotational symmetry with horizontal rotation about a vertical axis.

FIG. 26C shows a front elevational cross-sectional view of the dental implant assembly of FIG. 6 assembled and implanted in the jaw 112 of a patient, according to various embodiments. The flat base 212 is in contact with the flat bottom of the opening 220 in the jaw 112 of a patient. As can be seen from the depiction, the trans-gingival emergence profile 2640 characterizes a shape of the dental implant assembly as it emerges from bone 112 of the jaw, passes through gingiva 111, and transitions to the dental restoration 2670 which may be mounted as a top portion of the dental implant assembly 200. As illustrated, the trans-gingival emergence profile 2640 portion of the dental implant assembly 200 is configured to be disposed between bone-level of the jawbone 112 of a recipient patient and the restoration 2670 (when installed), meaning that the trans-gingival emergence profile 2640 encompasses the region of implant assembly 200 that transitions from the bone 112 through the gingiva 111 and meets with curved perimeter edge 247 and an installed restoration 2670 that is seated atop shoulder 246. As depicted, the gingiva 111 is very thin, but varied patient anatomies may include thicker gingiva extending as a continuous layer from bone level as high, or higher, than the top of the transitional escarpment 250. In this manner, the trans-gingival emergence profile 2640 portion of the dental implant assembly 200 comprises a sequence of different external surface shapes/eccentric steps (the top edge of eccentrically shaped curved lip 217, an exposed region of lower portion 270, transitional escarpment 250, and curved perimeter edge 247), which translate from one to another across the span of the trans-gingival emergence profile 2640 to present an anatomically correct gap in the trans-gingival region between any adjacent teeth by virtue of an extended mesial-distal dimension (i.e., dimension D2), as illustrated in FIG. 13, where dimension D2 differs from and is greater than dimension D1. Further, the span of the trans-gingival emergence profile achieves an overall eccentric shape across the span due to the eccentric shape of each of the different external shapes which combine to create the trans-gingival emergence profile 2640. The different dimensions D1 and D2 allow the curved end walls 210*a* and 210*b* of base member 204 to be placed near adjacent dentition while simultaneously maintaining a narrow D1 dimension to preserve bone on the sides of the alveolar ridge, and by extension allowing the trans-gingival emergence profile 2640 to close gaps above the bone level and against adjacent dentition by emerging from the bone with an elongated D2 profile as shown in FIG. 13, FIG. 25D, FIG. 26A, and FIG. 26B. For example, in one molar implant assembly embodiment, dimension D2 may be 10 mm while dimension D1 is 4.5 mm. For molar implant assemblies, the dimension D2 of a base member 204 may be 1.25 to 4.0 times D1, in some embodiments, and would emerge from jawbone into gingiva with those dimensions. In other embodiments, for molar implant assemblies, the dimension D2 of a base member 204 may be 1.4 to 3.5 times dimension of D1 and would emerge from jawbone into gingiva with those dimensions.

The ratio of dimension D2 to D1 of a base member 204 as it emerges from jawbone into gingiva may vary based on the type of tooth implant (e.g., molar, bicuspid, incisor). In some embodiments described herein dimension D2 of a base member 204 is between 1.1 to 1.25 times dimension D1. In some embodiments described herein dimension D2 of a base member 204 is between 1.25 to 1.5 times dimension D1. In some embodiments described herein dimension D2 of a base member 204 is between 1.5 to 1.75 times dimension D1. In some embodiments described herein dimension D2 of a base member 204 is between 1.75 to 2.0 times dimension D1. In some embodiments described herein dimension D2 of a base member 204 is between 2.0 to 2.25 times dimension D1. In some embodiments described herein dimension D2 of a base member 204 is between 2.25 to 2.5 times dimension D1. In some embodiments described herein dimension D2 of a base member 204 is between 2.5 to 2.75 times dimension D1. In some embodiments described herein dimension D2 of a base member 204 is between 2.75 to 3.0 times dimension D1. In some embodiments described herein dimension D2 of a base member 204 is between 3.0 to 3.5 times dimension D1. In some embodiments described herein dimension D2 of a base member 204 is between 3.5 to 4.0 times dimension D1. In some embodiments described herein dimension D2 of a base member 204 is between 4.0 to 4.5 times dimension D1. In some embodiments described herein dimension D2 of a base member 204 is between 4.5 to 5.0 times dimension D1. In some embodiments described herein dimension D2 of a base member 204 is between 5.0 to 5.5 times dimension D1. In some embodiments described herein dimension D2 of a base member 204 is between 5.5 to 6.0 times dimension D1. In some embodiments described herein dimension D2 of a base member 204 is between 6.0 to 6.5 times dimension D1. In some embodiments described herein dimension D2 of a base member 204 is between 6.5 to 7.0 times dimension D1. In some embodiments described herein dimension D2 of a base member 204 is between 1.1 to 3.5 times dimension D1. In some embodiments described herein dimension D2 of a base member 204 is between 1.4 to 7.0 times dimension D1. In some embodiments described herein dimension D2 of a base member 204 is between 1.1 to 7.0 times dimension D1.

It may be observed that the limitations of conventional round implants (those with orthogonal dimensions D1 and D2 being identical or nearly the same rather than with D2 being much larger) arise due to the need for a maximum allowable dimension across the alveolar ridge necessary to preserve adequate stabilizing bone for a durable implant placement. In most cases, using conventional round implants, this limitation forces the use of round implants with diameters much smaller than the mesial-distal space between adjacent dentition. This forces the trans-gingival emergence profile obtained by using such conventional round implants to expand greatly between bone level and restoration, or in some cases not to expand, but to create overhangs underneath the restoration, which must have dimensions appropriate to close gaps with adjacent dentition.

The trans-gingival emergence profiles (e.g., 2640) facilitated by the implants described herein which are extended in the mesial-distal dimension, as compared to their orthogonal buccal-lingual dimension, greatly reduce or eliminate these deficiencies associated with conventional implants. The very small and anatomically correct gap between adjacent dentition facilitated by the trans-gingival emergence profile 2640 mimics, emulates, and very closely resembles the gap between natural teeth and thus reduces or eliminates food entrapment that occurs with conventional implants which do not present an anatomically correct gap but instead provide for a very large gap and/or an undercut that does not naturally exist between teeth. The improved anatomical conformance and anatomically correct gap, both of which are facilitated by trans-gingival emergence profile 2640, not only provides a reduction of food trapping but provides for an implanted assembly which can be effectively flossed without difficulties of trapping floss in the trans-gingival region and/or without unflossable areas in the trans-gingival region presented by the much larger gaps and overhangs between teeth which are presented and created by conventional implants.

Figure 27A:
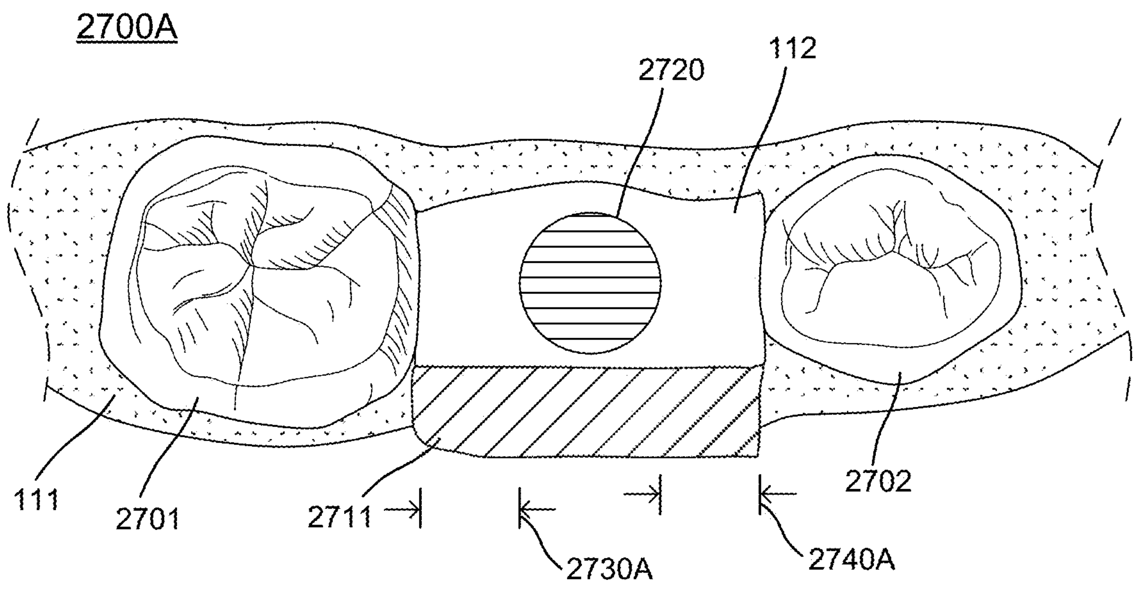
FIG. 27A depicts a top view showing gaps between adjacent natural dentition and the opening in the jawbone of a patient for a round base member of a conventional implant, according to an embodiment.

FIG. 27A depicts a top view 2700A showing gaps 2730A and 2740A between adjacent natural dentition and an opening 2720 in the jawbone 112 of a patient for a round base member of a conventional implant, according to an embodiment. Prior to forming opening 2720, jawbone 112 has been exposed by cutting a flap 2711 of gingiva 111 away to expose jawbone 112 between existing natural tooth 2701 and existing natural tooth 2702. As can be seen, a first large gap 2730A exists between tooth 2701 and opening 2720 and a second large gap 2740A and tooth 2702. Once a conventional round base is installed in opening 2720 these large and unnatural gaps (2730A and 2740A) will exist between a conventional round base member and the existing natural teeth (2701 and 2702) and will create pockets beneath the conventional implant and the adjacent dentition which will be difficult to floss or unflossable, and which will trap food. Food trapped in these pockets/gaps (2730A, 2740A) is difficult to remove, creating long-term issues, including: annoyance and discomfort; damage to adjacent teeth (2701, 2702); periodontal disease; and/or systemic health issues (Alzheimer's, heart disease, strokes, cancer, etc.).

Figure 27B:
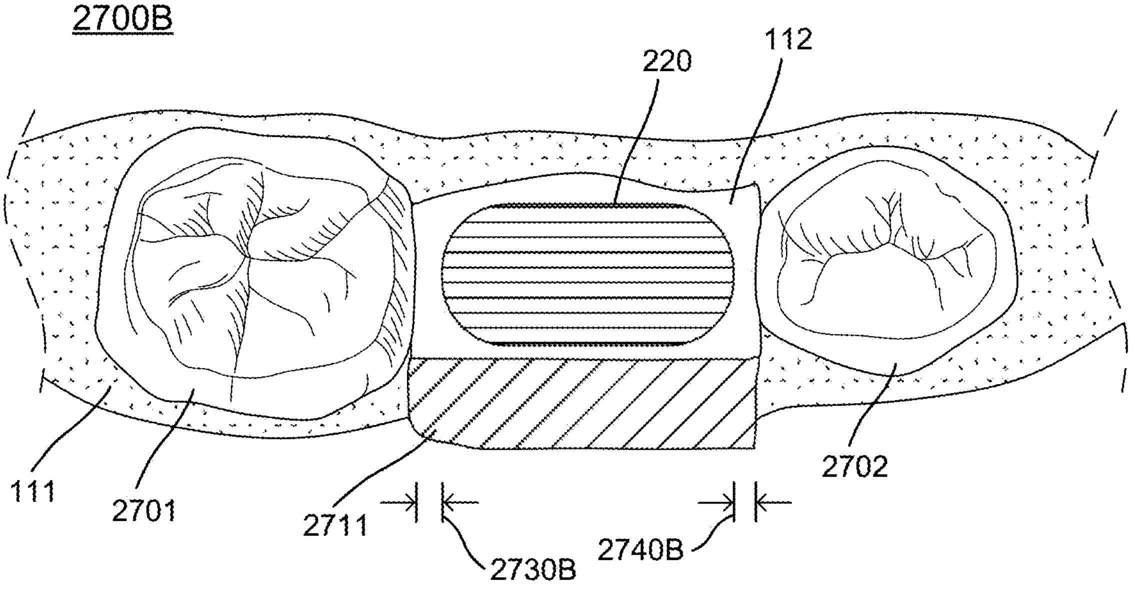
FIG. 27B depicts a top view showing gaps between adjacent natural dentition and the opening in the jawbone of a patient for an elongated non-round base member of an implant of the type described in FIGS. 5, 6, and 26A-26C, according to an embodiment.

FIG. 27B depicts a top view 2700B showing gaps 2730B and 2740B between adjacent natural dentition 2701 and 2702 and the opening 220 in the jawbone 112 of a patient for an elongated non-round base member of an implant (e.g., base member 204 of implant assembly 200) of the type described herein in FIGS. 5, 6, and 26A-26C, according to an embodiment. Prior to forming opening 220, jawbone 112 has been exposed by cutting a flap 2711 of gingiva 111 away to expose jawbone 112 between existing natural tooth 2701 and existing natural tooth 2702. As can be seen by comparison of opening 2720 and opening 220, the buccal-lingual dimensions are substantially the same, but the mesial-distal dimension of opening 220 has been elongated to be between 2.0 and 2.25 times larger than the buccal-lingual dimensions of openings 2720 and 220 and the mesial-distal dimension of opening 2720. Similar comparison shows that this elongation reduces the large interproximal gap 2730A by between 50% and 75% to achieve smaller interproximal gap 2730B and also reduces the large interproximal gap 2740A by between 50% and 75% to achieve smaller interproximal gap 2740B. Smaller interproximal gaps 2730B and 2740B still leave sufficient space between an implant assembly 200 installed in opening 220 and adjacent dentition (teeth 2701 and 2702) to allow proper flossing, hygiene, and healthy papilla, while also achieving a gap between an installed base member 204 and a previously installed implant assembly 200 that is within the spectrum of the width of a gap between normal natural teeth and emulates the shape of a natural gap that would exist between normal natural teeth, particularly in the trans-gingival region. The previously discussed elongation in the mesial-distal dimension also facilitates an implant assembly 200 which emulates the gaps and separation between natural dentition through the trans-gingival region to the top of a restoration installed on implant assembly 200, which correspondingly greatly reduces (and typically eliminates) unflossable undercuts/voids, difficult to floss undercuts, and food traps and the negative issues associated with each.

Example of an Alternative Transgingival Emergence Profile

Attention is now directed to FIGS. 28A-28F and the similarly functioning but alternative trans-gingival emergence profile 2840 presented by the assembled dental implant assembly 2800 as it emerges from bone, passes through gingiva, and transitions to the dental restoration which may be mounted atop the dental implant assembly. With general reference to FIGS. 28A-28F, except for the differences in the eccentric shape of dental implant assembly 2800 (triangular with rounded corners for dental implant assembly 2800 versus somewhat oval or stadium/obround with dental implant assembly 200), which will be described, it includes a similar trans-gingival emergence profile 2840 which reduces or eliminates undercut and voids in the trans-gingival region via inclusion of a transitional escarpment 2850 that is similar to the previously described transitional escarpment 250 of dental implant assembly 200.

Figure 28A:
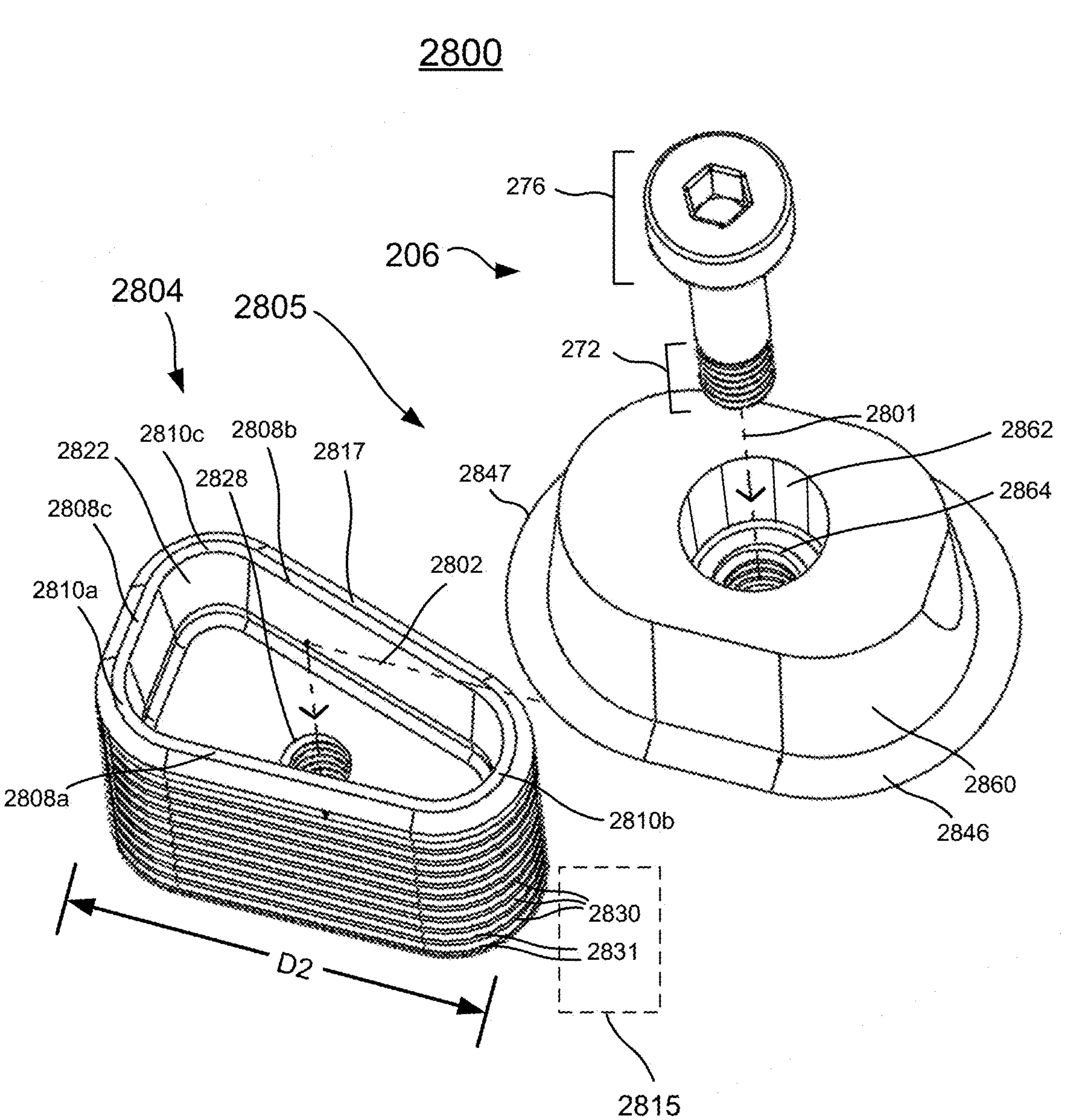
FIG. 28A shows an upper front perspective view with assembly instructions of a dental implant assembly, according to various embodiments.

FIG. 28A shows an upper front perspective view with assembly instructions of a dental implant assembly 2800, according to various embodiments. The dental implant assembly includes a base member 2804, an abutment member 2805, and optionally a fastener 206. The base member 2804 is adapted for placement into an opening in a jawbone. As previously described, in some embodiments, base member 2804 comprises three elongated vertical side walls 2808 (2808*a*, 2808*b*, 2808*c*) coupled by three curved end walls 2810 (2810*a*, 2810*b*, 2810*c*) which together define an eccentrically shaped external surface 2815 and a rounded triangular eccentrically shaped internal cavity 2822. As depicted, end walls 2810*a* and 2810*b* are separated by a maximum distance D1. Although referred to as separate "walls," it should be understood that the base member 2804 is formed as a seamless, integral component. The rounded triangular shape of the external surface 2815 of base member 2804 prevents it from twisting within the patient's bone cavity upon application of torque by an oral surgeon or other practitioner. In some embodiments, portions of rounded triangular eccentrically shaped external surface 2815 may be imbued with concentric external ridges 2830 and/or concentric external grooves 2831 (some portions may be smooth). An eccentrically shaped curved lip 2817 couples top edge perimeters of the external surface 2815 and the internal cavity 2822 to one another. In some embodiments the top viewed shape (e.g., when viewed from above) of the eccentrically shaped curved lip 2817 may be rounded triangular. In some embodiments, internal cavity 2822 may mirror the shape and/or radius of curvature exhibited by external surface 2815. In some embodiments, the internal cavity 2822 slopes slightly inward as it proceeds downward from eccentrically shaped curved lip 2817 toward its floor in which receiving threads 2828 are defined.

An abutment member 2805, which has previously been described, is shown as well. Abutment member 2805 includes a lower portion 2870 (visible in FIG. 28B), a shoulder 2846 with a curved perimeter edge 2847, an upper portion 2860, and a transitional escarpment 2850 (visible in FIG. 28B) located on the underside of the shoulder 2846. Transitional escarpment 2850 couples and smoothly translates the curved perimeter edge 2847 of the shoulder 2846 to the lower portion 2870. Lower portion 2870 has a rounded triangular eccentric shape and is shaped to correspond to the rounded triangular eccentric shape of the internal cavity 2822 of the base member 2804, while upper portion 2860 is shaped and adapted to receive a dental restoration 2670. As depicted, abutment member 2805 is adapted for placement, in a nested fashion, into the internal cavity 2822 of the base member 2804 and thus its lower portion 2870 is similarly shaped to internal cavity 2822 to facilitate this nesting.

Dashed assembly line 2802 includes a directional arrow on one end which shows the direction of fitment of abutment member 2805 into internal cavity 2822 of base member 2804. Similarly, dashed assembly line 2801 includes a directional arrow on one end which shows a direction that fastener 206 (when utilized) is installed into the assembled combination of the base member 2804 and the abutment member 2805.

As with dental implant assembly 200, fitment of a dental restoration (e.g., dental restoration 2670 of FIG. 26A) atop of an assembled dental implant assembly 2800 may be accomplished after dental implant assembly 2800 is installed in a patient's jaw 112.

As depicted in FIG. 28A and elsewhere, a fastener 206 which is adapted for insertion into an internal channel 2862 of the abutment member 2805, may be optionally included. Fastener 206 functions in the manner previously described. For example, base member 2804 further comprises internal receiving threads 2828 within the internal cavity 2822 which are configured to engage with lower threads 272 of the fastener 206. The fastener 206 further comprises a head 276 configured to engage with and seat into the abutment member 2805 and to progressively compress the abutment member 2805 into the base member 2804 in response to progressive engagement of the lower threads 272 into the receiving threads 2828 of the base member 2804. A removal tool 280 may be used, in the manner similar to what was previously discussed, to engage receiving threads 2864 to separate abutment member 2805 from base member 2804.

Figure 28B:
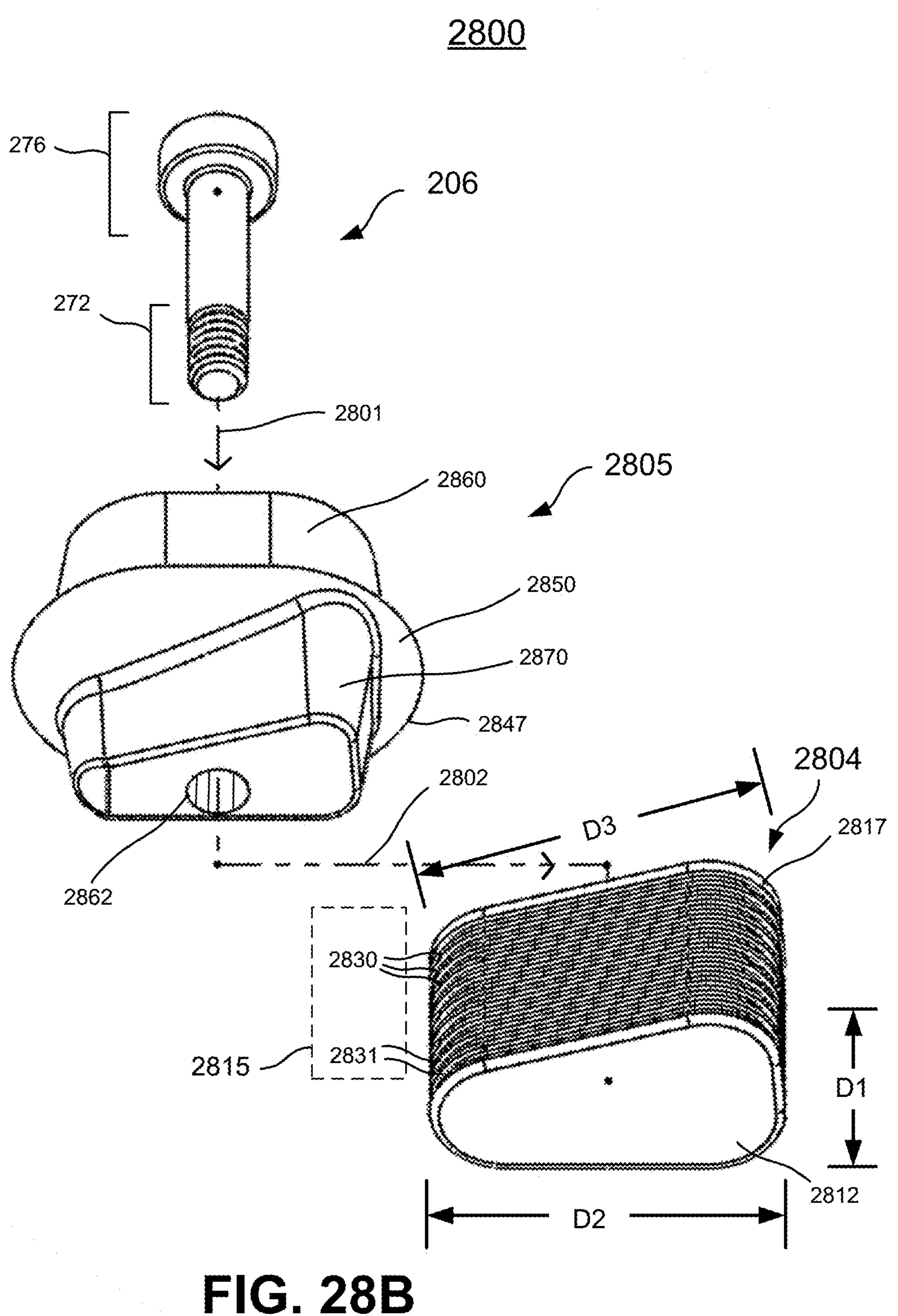
FIG. 28B shows a lower rear perspective view with assembly instructions of the dental implant assembly of FIG. 28A, according to various embodiments.

FIG. 28B shows a lower rear perspective view with assembly instructions (arrows 2801 and 2802) of the dental implant assembly 2800 of FIG. 28A, according to various embodiments. In FIG. 28B, the lower portion 2870 and transitional escarpment 2850 of lower portion 2870 are in view, as well as the bottom 2812 (which is flat, solid, and without an opening therethrough or extensions or securement members extending further downward therefrom) of base member 2804. As depicted, end walls 2810*a* and 2810*b* are separated by a maximum distance D1; while distance D2 is a maximum distance which separates end walls 2810*b* and 2810*c*; and distance D3 is a maximum distance which separates end walls 2810*a* and 2810*c*.

Figure 28C:
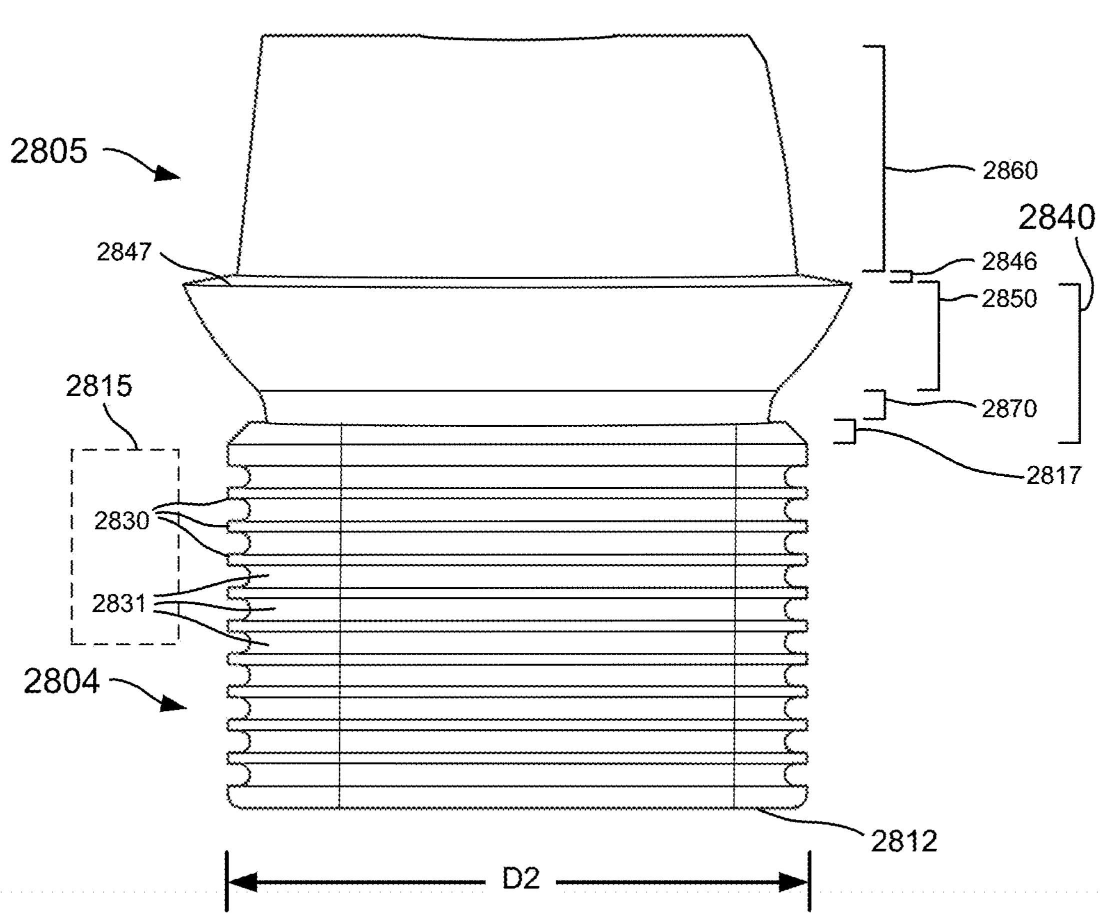
FIG. 28C shows a front elevational view of an assembled version of the dental implant assembly of FIG. 28A with labeling to detail aspects of the trans-gingival emergence profile portion of dental implant assembly, according to various embodiments, according to various embodiments.

FIG. 28C shows a front elevational view of an assembled version of the dental implant assembly 2800 of FIG. 28A with labeling to detail aspects of the trans-gingival emergence profile 2840 portion of dental implant assembly 2800, according to various embodiments, according to various embodiments. In response to placement of the abutment member 2805 in the internal cavity of the base member 2804 a trans-gingival emergence profile 2840 is formed between a top edge of the eccentrically shaped curved lip 2817 and curved perimeter edge 2847 of shoulder 2846, and includes an exposed (i.e., visible) region of the lower portion 2870 of the abutment member 2805 and the transitional escarpment 2850 that are between the top of the eccentrically shaped curved lip 2817 and curved perimeter edge 2847 of shoulder 2846. In the depicted embodiment, lower portion 2870 has three curved corner walls which are connected in curved triangle by three straight walls. The transitional escarpment 2850 has a truncated cone shape (i.e., it is truncated on the bottom by the top edges of lower portion 2870 and does not come to a point as a full conical shape would). In various embodiments, the cone shape may be similar to that of a regular cone with some or all sides being straight until they converge with lower portion 2870. In other embodiments some or all of the side portions of transitional escarpment 2850 may be curved, such as with convex (i.e., outwardly bowing) curvatures or concave (i.e., slightly inwardly bowing) curvatures. As depicted, the truncated eccentric cone shape has slightly outwardly bowed convex surfaces which reduce or eliminate undercuts/voids which can entrap food as compared to conventional dental implant assemblies.

Figure 28D:
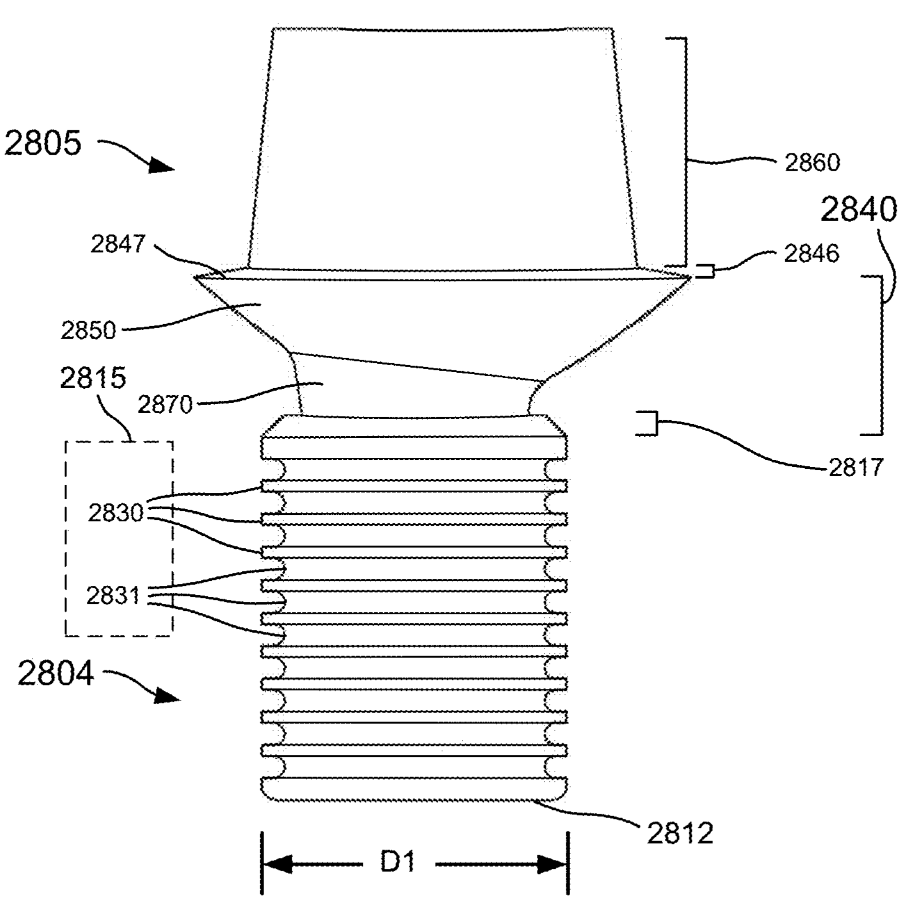
FIG. 28D shows a left side elevational view of an assembled version of the dental implant assembly of FIG. 28A with labeling to detail aspects of the trans-gingival emergence profile portion of dental implant assembly, according to various embodiments, according to various embodiments.

FIG. 28D shows a left side elevational view of an assembled version of the dental implant assembly 2800 of FIG. 28A with labeling to detail aspects of the trans-gingival emergence profile 2840 portion of dental implant assembly 2800, according to various embodiments, according to various embodiments.

Figure 28E:
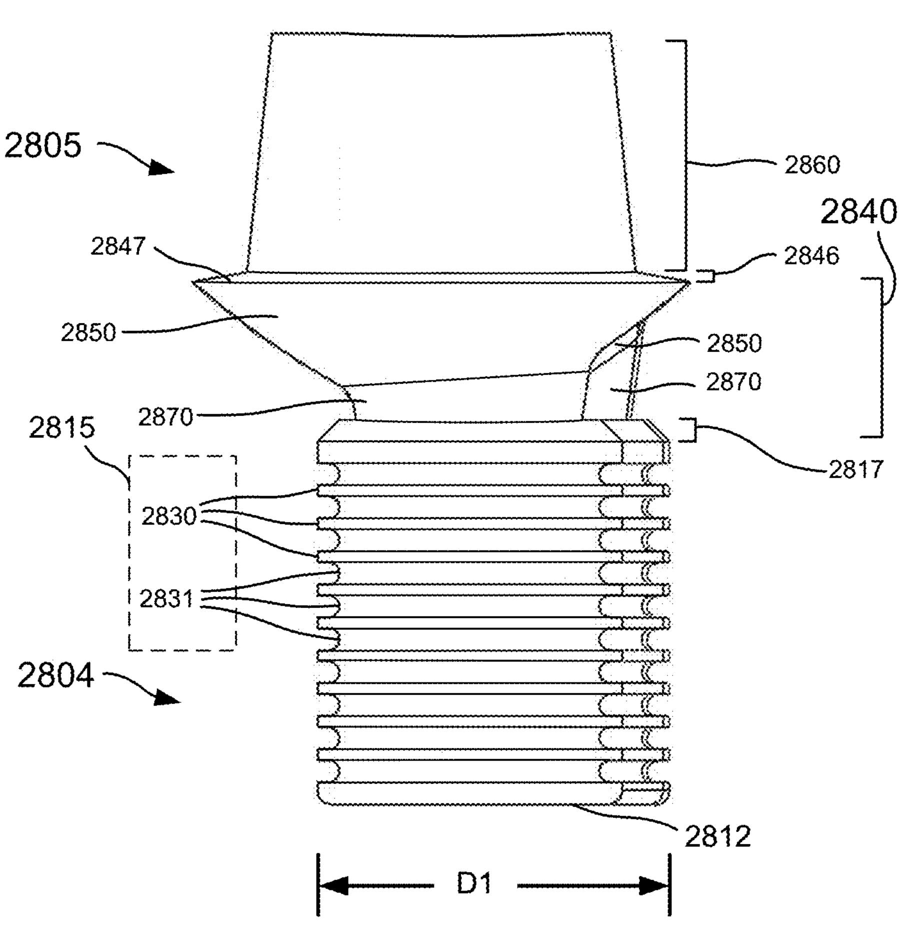
FIG. 28E shows a right side elevational view of an assembled version of the dental implant assembly of FIG. 28A with labeling to detail aspects of the trans-gingival emergence profile portion of dental implant assembly, according to various embodiments.

FIG. 28E shows a right side elevational view of an assembled version of the dental implant assembly 2800 of FIG. 28A with labeling to detail aspects of the trans-gingival emergence profile 2840 portion of dental implant assembly 2800, according to various embodiments. As can be seen from the left and ride side elevational views, neither the transitional escarpment 2850 nor the assembled components of trans-gingival emergence profile 2840 has any rotational symmetry when rotated horizontally around a vertical axis with respect to FIG. 28C, 28D, or 28E.

Figure 28F:
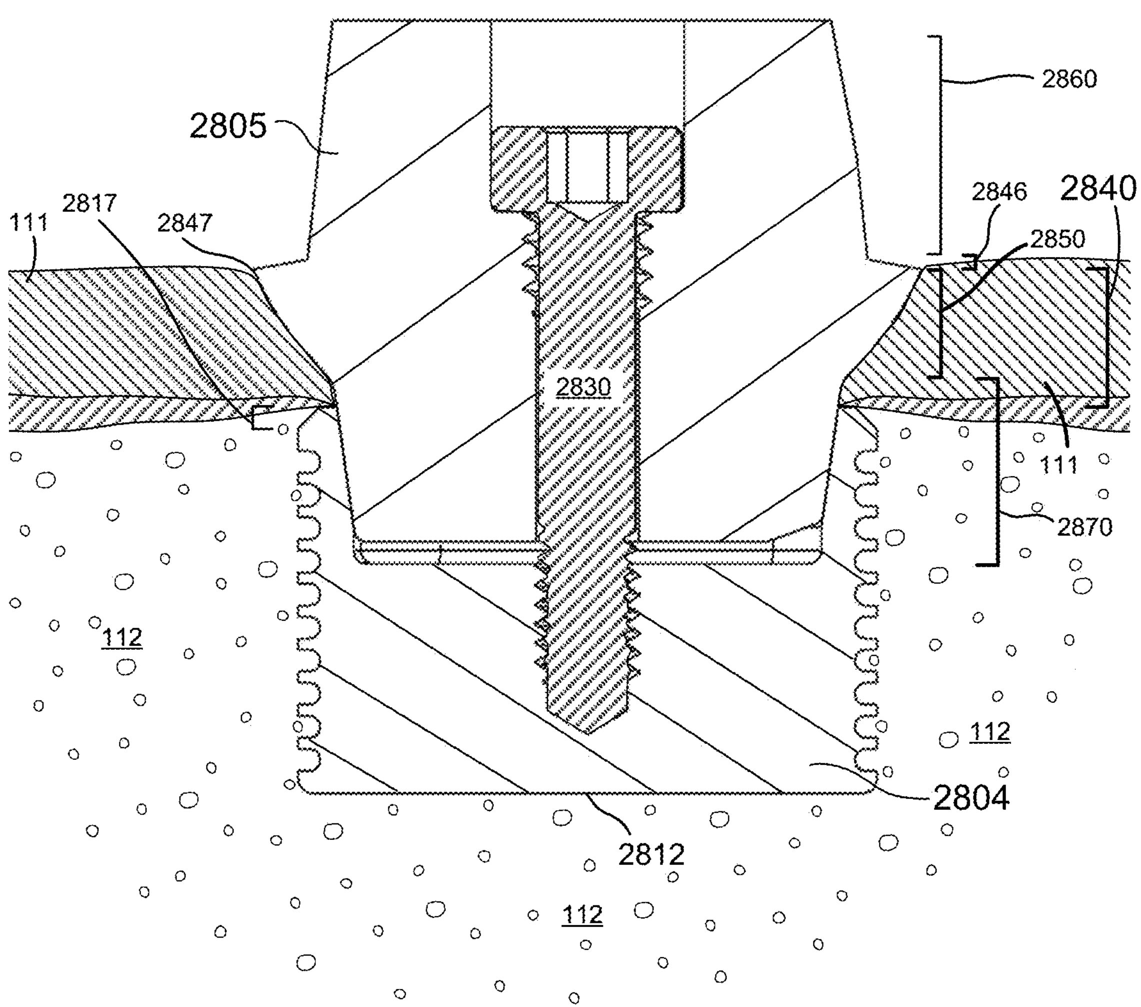
FIG. 28F shows a front elevational cross-sectional view of the dental implant assembly of FIG. 28A assembled and implanted in the jaw of a patient, according to various embodiments.

FIG. 28F shows a front elevational cross-sectional view of the dental implant assembly of FIG. 28A assembled and implanted in the jaw 112 of a patient, according to various embodiments. As can be seen from the depiction, the trans-gingival emergence profile 2840 characterizes a shape of the dental implant assembly 2800 as it emerges from bone 112 of the jaw, passes through gingiva 111, and transitions to the dental restoration 2670 which may be mounted as a top portion of the dental implant assembly 2800. As illustrated, the trans-gingival emergence profile 2840 portion of the dental implant assembly 2800 is configured to be disposed between bone-level of the jawbone 112 of a recipient patient and the restoration 2670 (when installed), meaning that the trans-gingival emergence profile 2840 encompasses the region of dental implant assembly 2800 that transitions from the bone 112 through the gingiva 111 and meets with curved perimeter edge 2847 and an installed restoration 2670 that is seated atop shoulder 2846. As depicted, the gingiva 111 is very thin, but varied patient anatomies may include thicker gingiva extending as a continuous layer from bone level as high, or higher, than the top of the transitional escarpment 2850. In this manner, the trans-gingival emergence profile 2840 portion of the dental implant assembly 2800 comprises a sequence of different external surface shapes/eccentric steps (the top edge of eccentrically shaped curved lip 2817, an exposed region of lower portion 2870, transitional escarpment 2850, and curved perimeter edge 2847), which translate from one to another across the span of the trans-gingival emergence profile 2840 to achieve an overall eccentric shape and present an anatomically correct gap in the trans-gingival region between any adjacent teeth by virtue of an extended mesial-distal dimension (i.e., dimension D2), as illustrated in FIGS. 28B-28E and 28, where dimension D2 differs from and is greater than dimension D1. Further, the span of the trans-gingival emergence profile achieves an overall eccentric shape across the span due to the eccentric shape of each of the different external shapes which combine to create the trans-gingival emergence profile 2840. The different dimensions D1 and D2 allow the rounded ends 2810 (2810*a*, 2810*b*, and 2810*c*) of base member 2804 to be placed near adjacent dentition while simultaneously maintaining a narrow D1 dimension to preserve bone on the sides of the alveolar ridge, and by extension allowing the trans-gingival emergence profile 2840 to close gaps above the bone level and against adjacent dentition by emerging from the bone with an elongated D2 profile as shown in FIG. 28A, FIG. 28B, and FIG. 28C. For example, in one molar implant assembly embodiment, dimension D2 may be 10 mm while dimension D1 is 4.5 mm. For molar implant assemblies, the dimension D2 of a base member 204 may be 1.25 to 3.5 times D1, in some embodiments, and would emerge from jawbone into gingiva with those dimensions. In other embodiments, for molar implant assemblies, the dimension D2 of a base member 204 may be 1.4 to 3 times dimension of D1, and would emerge from jawbone into gingiva with those dimensions.

The ratio of dimension D2 to D1 of a base member 204 as it emerges from jawbone into gingiva may vary based on the type of tooth implant (e.g., molar, bicuspid, incisor). In some embodiments described herein dimension D2 of a base member 2804 is between 1.1 to 1.25 times dimension D1. In some embodiments described herein dimension D2 of a base member 2804 is between 1.25 to 1.5 times dimension D1. In some embodiments described herein dimension D2 of a base member 2804 is between 1.5 to 1.75 times dimension D1. In some embodiments described herein dimension D2 of a base member 2804 is between 1.75 to 2.0 times dimension D1. In some embodiments described herein dimension D2 of a base member 2804 is between 2.0 to 2.25 times dimension D1. In some embodiments described herein dimension D2 of a base member 2804 is between 2.25 to 2.5 times dimension D1. In some embodiments described herein dimension D2 of a base member 2804 is between 2.5 to 2.75 times dimension D1. In some embodiments described herein dimension D2 of a base member 2804 is between 2.75 to 3.0 times dimension D1. In some embodiments described herein dimension D2 of a base member 2804 is between 1.1 to 3 times dimension D1. In some embodiments described herein dimension D2 of a base member 2804 is between 3.0 to 3.5 times dimension D1. In some embodiments described herein dimension D2 of a base member 2804 is between 3.5 to 4.0 times dimension D1. In some embodiments described herein dimension D2 of a base member 2804 is between 4.0 to 4.5 times dimension D1. In some embodiments described herein dimension D2 of a base member 2804 is between 4.5 to 5.0 times dimension D1. In some embodiments described herein dimension D2 of a base member 2804 is between 5.0 to 5.5 times dimension D1. In some embodiments described herein dimension D2 of a base member 2804 is between 5.5 to 6.0 times dimension D1. In some embodiments described herein dimension D2 of a base member 2804 is between 6.0 to 6.5 times dimension D1. In some embodiments described herein dimension D2 of a base member 2804 is between 6.5 to 7.0 times dimension D1. In some embodiments described herein dimension D2 of a base member 2804 is between 1.1 to 3.5 times dimension D1. In some embodiments described herein dimension D2 of a base member 2804 is between 1.4 to 7.0 times dimension D1. In some embodiments described herein dimension D2 of a base member 2804 is between 1.1 to 7.0 times dimension D1.

It may be observed that the limitations of conventional round implants (those with orthogonal dimensions D1 and D2 being identical or nearly the same rather than with D2 being much larger) arise due to the need for a maximum allowable dimension across the alveolar ridge necessary to preserve adequate stabilizing bone for a durable implant placement. In most cases using conventional round implants, this limitation forces the use of round implants with diameters much smaller than the mesial-distal space between adjacent dentition. This forces the trans-gingival emergence profile obtained by using such conventional round implants to expand greatly between bone level and restoration, or in some cases not to expand, but to create overhangs underneath the restoration, which must have dimensions appropriate to close gaps with adjacent dentition. However, as can be seen from the previously described figures, all of the components and elements which together form the trans-gingival emergence profiles (e.g., 2640, 2840) described herein are eccentric in shape, thus resulting in trans-gingival emergence profiles which are stepped (i.e., have different levels/steps/graduations) but with each step and the overall trans-gingival emergence profile (e.g., 2640, 2840) being eccentric.

The trans-gingival emergence profiles (e.g., 2640, 2840) facilitated by the implants described herein which are extended in the mesial-distal dimension, as compared to their orthogonal buccal-lingual dimension, greatly reduce or eliminate these deficiencies associated with conventional implants. For example, the very small and anatomically correct gap between adjacent dentition facilitated by the trans-gingival emergence profile 2840 mimics, emulates, and very closely resembles the gap between natural teeth and thus reduces or eliminates food entrapment that occurs with conventional implants which do not present an anatomically correct gap but instead provide for a very large gap and/or an undercut that does not naturally exist between teeth. The improved anatomical conformance and anatomically correct gap not only provides a reduction of food trapping but provides for an implanted assembly which can be effectively flossed without difficulties of trapping floss in the trans-gingival region and/or without unflossable areas in the trans-gingival region presented by the much larger gaps and overhangs between teeth which are presented and created by conventional implants.

Although not depicted, it should be appreciated that base member 2804 may be manufactured to include one or more of the inward/internal taper 342 or inward/internal pinch 344 features demonstrated in the alternative bases shown in FIGS. 22A, 22B, 23A, 23B, and/or 24.

Figure 29:
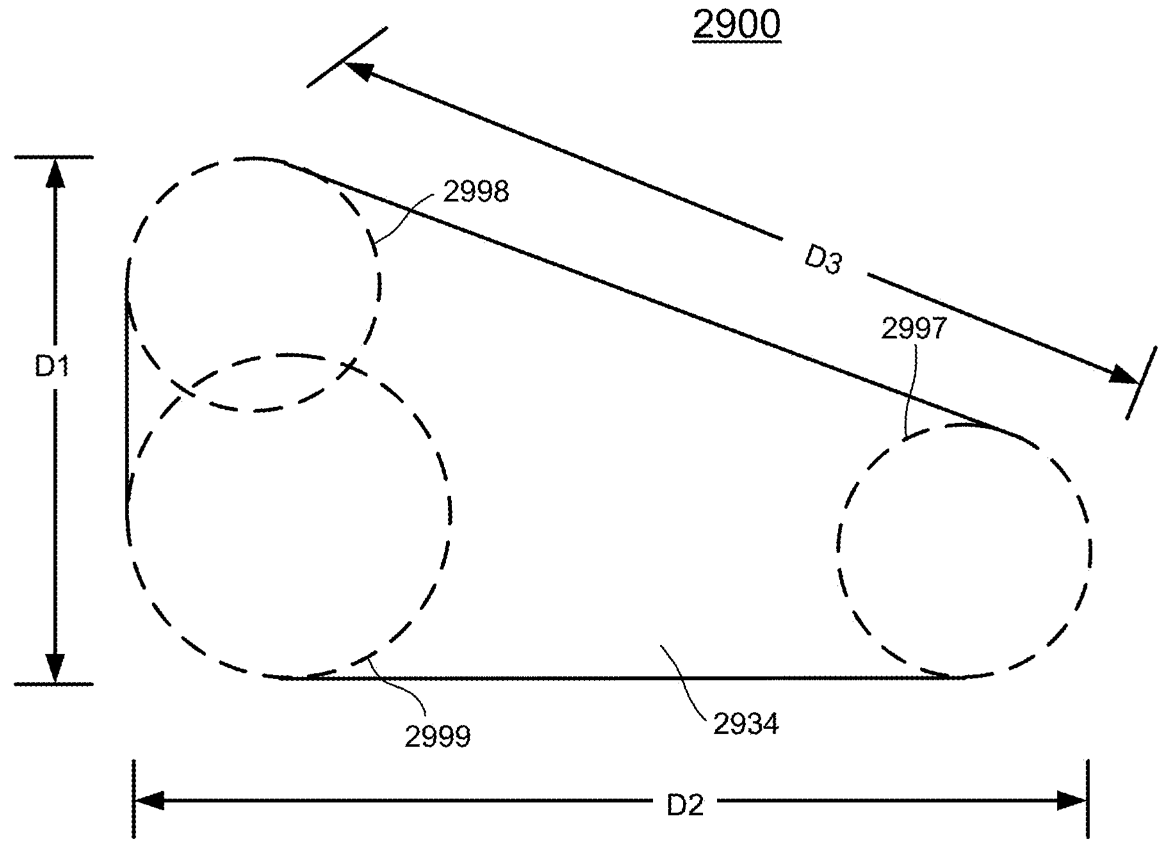
FIG. 29 shows a schematic of various burr cuts that may be made in a patient jawbone in order to receive the dental implant assembly of FIGS. 28A-28F.

FIG. 29 shows a schematic 2900 of various burr cuts that may be made in a patient jawbone in order to receive the dental implant assembly of FIGS. 28A-28F. FIG. 29 illustrates the various advantageous and customized emergence profiles that may be created according to various embodiments, where these customized profiles may be used for different regions of the mouth due to variations in tooth shape/size and/or for accommodation of varied patient anatomy. Similar to the methods illustrated by FIGS. 13 and 25D, the resulting opening 2900 was created in the patient's jawbone 112 is sized to receive an appropriate base member 2804 of dental implant assembly 2800 as shown in FIG. 28F. When an appropriate base member 2804 is used, it should be understood that the top perimeter and the bottom perimeter of the base member 2804 are the same shape as the osteotomy created. Channel 2934 may also be drilled/cut so that the most outer edges of openings 2997 and 2999 are a distance D2 from one another; the outer edges of openings 2998 and 2999 are a distance D1 from one another; and the outer edges of openings 2998 and 2997 are a distance D3 from one another. However, because the openings 2997, 2998, and 2999, in this embodiment, are or may be sized differently, the channel 2934 may have walls which taper outward from bottom to top in some embodiments. In some such embodiments, such outwardly tapering walls match outwardly tapering elongated walls which may be implanted in various embodiments of base member 2804 of FIGS. 28A-28F.

X-Ray Comparison of Emergence Profiles

Figure 30:
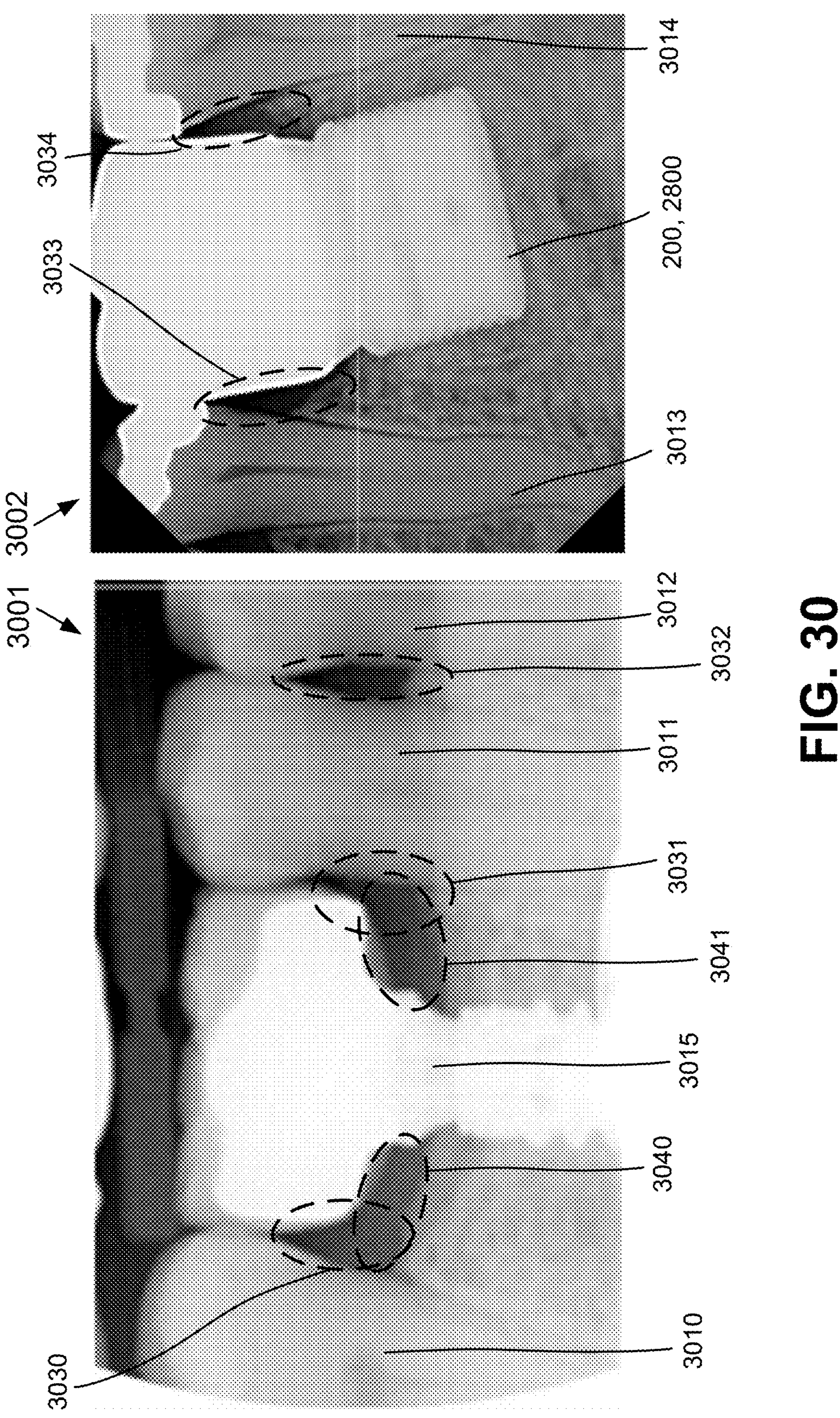
FIG. 30 depicts side-by-side bitewing type x-rays which illustrate a front side view comparison of trans-gingival gaps between adjacent natural dentition, trans-gingival gaps between adjacent natural dentition and a conventional implant, and trans-gingival gaps between adjacent elongated implant assemblies described herein and adjacent natural dentition, according to various embodiments.

FIG. 30 depicts side-by-side bitewing type x-rays 3001 and 3002 which illustrate a front side view comparison of interproximal gaps between adjacent natural dentition, interproximal gaps between adjacent natural dentition and a conventional implant, and interproximal gaps between adjacent elongated implant assemblies described herein (e.g., 200, 2800) and adjacent natural dentition, according to various embodiments.

In x-ray 3001 three natural teeth 3010, 3011 and 3012 are illustrated along with a conventional implant assembly 3015 which utilizes a round base member. Conventional implant assembly 3015 is disposed between natural teeth 3010 and 3011; while natural teeth 3011 and 3012 are adjacent to one another. A natural interproximal gap 3032 is illustrated between adjacent teeth 3011 and 3012. Between conventional implant assembly 3015 and adjacent tooth 3010 is a large, unnatural interproximal gap 3030 which includes a large food trapping undercut 3040 in the trans-gingival region. Likewise, between conventional implant assembly 3015 and adjacent tooth 3011 is a large, unnatural interproximal gap 3031 which includes a large food trapping undercut 3041 in the trans-gingival region. As can be seen, these large and unnatural interproximal gaps 3030, 3031 between conventional implant assembly 3015 and adjacent natural dentition 3010 and 3011 are two to three times larger than the natural interproximal gap 3032 between tooth 3011 and tooth 3012. Further, the conventional implant assembly 3015 exhibits undercuts 3040, 3041 which are not present beneath natural dentition.

In x-ray 3002 two natural teeth 3013 and 3014 are illustrated along with an implant assembly 200 (or 2800) of the type described herein which uses a base member like base member 204 (or base member 2804) that has been elongated in the mesial-distal dimension in the manner previously described. The implant assembly 200, 2800 is disposed between natural teeth 3013 and 3014. A small interproximal gap 3033 is illustrated between implant assembly 200, 2800 and adjacent tooth 3013 and it emulates the size and shape of natural interproximal gap 3032 that is illustrated in x-ray 3001. Likewise, a small interproximal gap 3034 is illustrated between implant assembly 200, 2800 and adjacent tooth 3014 and it also emulates the size and shape of natural interproximal gap 3032 in the interproximal region that is illustrated in x-ray 3001. As can be seen, the trans-gingival emergence profile regions (see, e.g., 2640 of FIG. 26C; 2840 of FIG. 28F) between implant assembly 200, 2800 and adjacent dentition 3013, 3014 emulate that of natural interproximal gap 3032. Further, the emergence profile regions emulate natural dentition by exhibiting no undercut, like undercut 3041, in the trans-gingival region which would trap food or/or be more difficult to floss than the interproximal gap 3032 in the trans-gingival region between natural teeth 3011 and 3012. Put differently, the trans-gingival emergence profile (e.g., 2640, 2840) of the type described herein in conjunction with implant assembly 200, 2800, or the like creates an interproximal gap between adjacent dentition that emulates the size and shape of a natural interproximal gap between adjacent natural teeth, and it does so without an undercut void between the abutment member and base of the implant assembly. This is the case whether the implant assembly (200, 2800, or the like) is implanted adjacent to a natural tooth or adjacent to a like implant assembly (e.g., 200, 2800, or the like).

CONCLUSION

As may be understood from the foregoing, a dental implant assembly is disclosed whereby an eccentrically-shaped osteotomy cavity is formed in jawbone and then an eccentrically-shaped base member of the implant is positioned into the cavity. The base member serves as a platform to secure an eccentrically-shaped abutment member of the implant that in turn receives a dental restoration, such as a crown or denture. Advantageously, such an implementation may make it easy for a physician to slip the abutment member into the base member with a correct or proper orientation, and also prevent the abutment member from rotating with respect to the base member due to the complementary oblong or oval geometry of these pieces. Additionally, various features of the pieces or parts of the dental implant may be surface treated in order to improve bone integration and in general fit together with precision.

Furthermore, certain parts or mating areas such as between eccentric surfaces of an abutment member a base member, and surfaces between the base member and an optional fastener, may utilize a very slightly tapered angle so the parts may "cold weld" to tightly lock the pieces together. Advantageously, this may distribute forces more evenly across two pieces, and can also create a seal at a joint to prevent bacterial micro-leakage.

It should be understood that this disclosure relates to components that may be used with various jaw sizes. For example, the base member, the abutment member, and/or the fasteners described herein may have any appropriate diameter, length, taper, or any other dimensions or geometries that allow the system to be used with various jaw sizes. It should be understood that the disclosure may be sized down for use with children and/or sized up for use with particularly large jaw sizes, and by implication, including the full range of tooth sizes from molars to front teeth.

Additionally, although multiple components are described for use in cooperation with one another, it should be understood that it is possible to provide one piece version of the disclosed implant that may be pressed into the pre-drilled osteotomy and into the bone, rather than requiring screws and a multipart implant. In certain embodiments, a one-piece press fit implant having the outer eccentric shapes described herein, may be useful. A one-piece press fit implant may be used for both anterior and posterior teeth. Various sizes are possible and considered within the scope of this disclosure.

The implants disclosed herein may be manufactured using any appropriate methods. In certain examples, powdered metal sintering using 3-D Selective Laser Sintering or SLS printing as possible. The implants disclosed herein may be made of any appropriate biocompatible materials.

A dental implant system or assembly and a method for implanting the same are contemplated and claimed and, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, the methods, systems or assemblies as discussed above are examples. Various configurations may omit, substitute, or add various method steps or procedures, or components as appropriate. For instance, in alternative examples, the methods may be performed in an order different from that described, and/or various stages may be added, omitted, and/or combined.

What is claimed:

1. A dental implant assembly comprising:

a base member adapted for placement into an opening in a jawbone of a recipient patient, wherein the base member comprises elongated side walls coupled with opposing curved end walls which together define an obround shaped external surface and an eccentrically shaped internal cavity, and an eccentrically shaped curved lip which couples top edge perimeters of the obround shaped external surface and the eccentrically shaped internal cavity to one another; and an abutment member adapted for placement into the eccentrically shaped internal cavity of the base member, wherein the abutment member includes a lower portion, a shoulder with a curved perimeter edge, an upper portion, and a transitional escarpment which couples and smoothly translates the curved perimeter edge of the shoulder to the lower portion, wherein the lower portion is shaped to correspond to the eccentric shape of the eccentrically shaped internal cavity of the base member, wherein the upper portion is adapted to receive a dental restoration, and wherein the mesial-distal span of the curved perimeter edge of the shoulder is equal to the outermost mesial distal span of the base member while the buccal-lingual span of the curved perimeter edge of the shoulder is greater than the buccal-lingual span of the base member; and wherein responsive to placement of the abutment member in the eccentrically shaped internal cavity of the base member a trans-gingival emergence profile is formed between a top edge of the eccentrically shaped curved lip and an exposed region of the lower portion and the transitional escarpment located between the eccentrically shaped curved lip and the curved perimeter edge of the shoulder, wherein, responsive to placement in the jawbone of the recipient patient, the trans-gingival emergence profile characterizes a shape of the dental implant assembly.

2. The dental implant assembly of claim 1, further comprising:

a fastener adapted for insertion into an internal channel of the abutment member, wherein the base member further comprises internal receiving threads within the eccentrically shaped internal cavity, and wherein the fastener comprises a set of lower threads configured to engage the internal receiving threads of the base member, and where the fastener further comprises a head configured to engage the abutment member and progressively compress the abutment member into the base member in response to progressive engagement of the lower threads into the internal receiving threads of the base member.

3. The dental implant assembly of claim 1, wherein the base member further comprises a flat base coupled with the obround shaped external surface, wherein the flat base is a solid bottom to the base member without an opening therethrough or extensions or securement members extending further downward therefrom.

4. The dental implant assembly of claim 1, wherein the trans-gingival emergence profile portion of the dental implant assembly is configured to be disposed between bone-level of the jawbone of a recipient patient and the dental restoration.

5. The dental implant assembly of claim 1, wherein the trans-gingival emergence profile portion of the dental implant assembly comprises a sequence of eccentric steps which translate from one to another across a span of the trans-gingival emergence profile to achieve an overall eccentric shape across the span.

6. The dental implant assembly of claim 1, wherein the trans-gingival emergence profile portion of the dental implant assembly eliminates undercuts and voids between the abutment member and the base member of the dental implant assembly.

7. The dental implant assembly of claim 1, wherein, in response to placement in the jawbone of the recipient patient, the trans-gingival emergence profile portion of the dental implant assembly is configured to eliminate undercuts and voids in a trans-gingival region of the recipient patient.

8. The dental implant assembly of claim 1, wherein, when placed in the jawbone of the recipient patient, the trans-gingival emergence profile portion of the dental implant assembly is configured to create an interproximal gap between adjacent dentition in the jawbone of the recipient patient that emulates both size and shape of a natural interproximal gap between adjacent natural teeth.

9. The dental implant assembly of claim 1, wherein the curved perimeter edge is obround in shape when viewed from above.

10. The dental implant assembly of claim 1, wherein the transitional escarpment has a truncated cone shape.

11. The dental implant assembly of claim 1, wherein an external surface of the transitional escarpment is convex.

12. The dental implant assembly of claim 1, wherein the eccentric shape of the eccentrically shaped internal cavity is oval.

13. The dental implant assembly of claim 1, wherein the eccentric shape of the eccentrically shaped internal cavity is obround.

14. The dental implant assembly of claim 1, wherein the eccentric shape of the eccentrically shaped internal cavity is rounded but non-circular.

15. The dental implant assembly of claim 1, wherein the elongated side walls are vertically parallel to one another.

* * * * *